(12) United States Patent
Obayashi et al.

(10) Patent No.: US 10,371,582 B2
(45) Date of Patent: Aug. 6, 2019

(54) SIGNAL GENERATION CIRCUIT AND TEMPERATURE SENSOR

(71) Applicant: RENESAS ELECTRONICS CORPORATION, Tokyo (JP)

(72) Inventors: Shigeki Obayashi, Tokyo (JP); Hiroki Shimano, Tokyo (JP); Masataka Minami, Tokyo (JP); Hiroji Ozaki, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 21 days.

(21) Appl. No.: 15/861,819

(22) Filed: Jan. 4, 2018

(65) Prior Publication Data

US 2018/0128689 A1    May 10, 2018

Related U.S. Application Data

(63) Continuation of application No. 14/459,356, filed on Aug. 14, 2014, now Pat. No. 9,891,116.

(30) Foreign Application Priority Data

Sep. 2, 2013 (JP) .................................. 2013-181430

(51) Int. Cl.
*G01K 7/01* (2006.01)

(52) U.S. Cl.
CPC ...................................... *G01K 7/01* (2013.01)

(58) Field of Classification Search
CPC .................................................. G01K 7/015
See application file for complete search history.

(56) References Cited

U.S. PATENT DOCUMENTS 7,791,417 B2   9/2010  Wang
8,303,178 B2  11/2012  Yi
(Continued)

FOREIGN PATENT DOCUMENTS

CN   101093401 A   12/2007
JP   2004-310444 A  11/2004
(Continued)

OTHER PUBLICATIONS

Rincon-Mora (pp. 23-29 of Chapter 2 "Current References" in Voltage references: from diodes to precision high-Order bandgap circuits. IEEE Press, 2002).

(Continued)

*Primary Examiner* — Clayton E. LaBalle
*Assistant Examiner* — Leon W Rhodes, Jr.
(74) *Attorney, Agent, or Firm* — Mattingly & Malur, PC

(57) ABSTRACT

To provide a signal generation circuit having a short settling time of an output voltage. In a PTAT signal generation circuit, a trimming circuit is coupled between the cathodes of 0-th to K-th diodes and a line of a ground voltage, the anode of the 0-th diode is coupled to a first node, the anodes of the first to the K-th diodes are coupled to a second node via a resistive element, the first node and the second node are set to the same voltage, a first current flowing through the 0-th diode and a second current flowing through the first to the K-th diodes are set to have the same value, and a third current flowing through the trimming circuit is set to have the value 2 times that of each of the first current and the second current.

6 Claims, 34 Drawing Sheets

(56) References Cited

U.S. PATENT DOCUMENTS

| | | | |
|---|---|---|---|
| 8,542,000 B1 | 9/2013 | Youssefi | |
| 9,164,527 B2 * | 10/2015 | Huang | G05F 3/30 |
| 2007/0296392 A1 | 12/2007 | Chen et al. | |
| 2009/0066313 A1 | 3/2009 | Kimura | |
| 2009/0201067 A1 * | 8/2009 | Haneda | G05F 3/30 |
| | | | 327/306 |

FOREIGN PATENT DOCUMENTS

| | | |
|---|---|---|
| JP | 2009-80786 A | 4/2009 |
| JP | 2009-217809 A | 9/2009 |
| JP | 2011-215129 A | 10/2011 |

OTHER PUBLICATIONS

Chinese Office Action received in corresponding Chinese Application No. 20140443119.6 dated Sep. 2, 2016.
Japanese Office Action received in corresponding Japanese Application No. 2013-181430 dated Jan. 10, 2017.
Chinese Office Action received in corresponding Chinese Application No. 201410443119.6 dated Apr. 26, 2017.

\* cited by examiner

US 10,371,582 B2

SIGNAL GENERATION CIRCUIT AND TEMPERATURE SENSOR

CROSS-REFERENCE TO RELATED APPLICATION

The disclosure of Japanese Patent Application No. 2013-181430 filed on Sep. 2, 2013 including the specification, drawings and abstract is incorporated herein by reference in its entirety.

BACKGROUND

The present invention relates to a signal generation circuit and a temperature sensor, and in particular can be suitably used for a signal generation circuit and a temperature sensor that output a voltage proportional to the absolute temperature.

In the related art, there is known a PTAT (Proportional To Absolute Temperature) signal generation circuit that outputs, utilizing the fact that the difference between the forward voltages of first and second diodes having a size (that is, a current drive capability) different from each other is proportional to the absolute temperature, a PTAT signal whose voltage varies in proportion to the absolute temperature (for example, Japanese Patent Laid-Open No. 2009-217809 (Patent Literature 1) and Japanese Patent Laid-Open No. 2011-215129 (Patent Literature 2)).

SUMMARY

However, the related art PTAT signal generation circuit and temperature sensor using the same have a problem in which the settling time the output voltage settles is long.

The other purposes and the new feature of the present invention will become clear from the description of the present specification and the accompanying drawings.

In a signal generation circuit of the present application, between cathodes of first and second diodes and a line of a reference voltage, there is provided an output circuit that outputs, on the basis of the current of a sum of the currents flowing through the first and second diodes, a voltage proportional to the absolute temperature.

Furthermore, in a temperature sensor of the present application, an amplifier that amplifies an output signal of the signal generation circuit includes a differential amplifier, a source ground amplifier, a source follower amplifier, and a phase compensation circuit, and the phase compensation circuit includes a varactor capacitive element and resistive element which are coupled in series.

According to the embodiment, the settling time of the output voltage can be reduced.

DETAILED DESCRIPTION

First Embodiment

Figure 1:
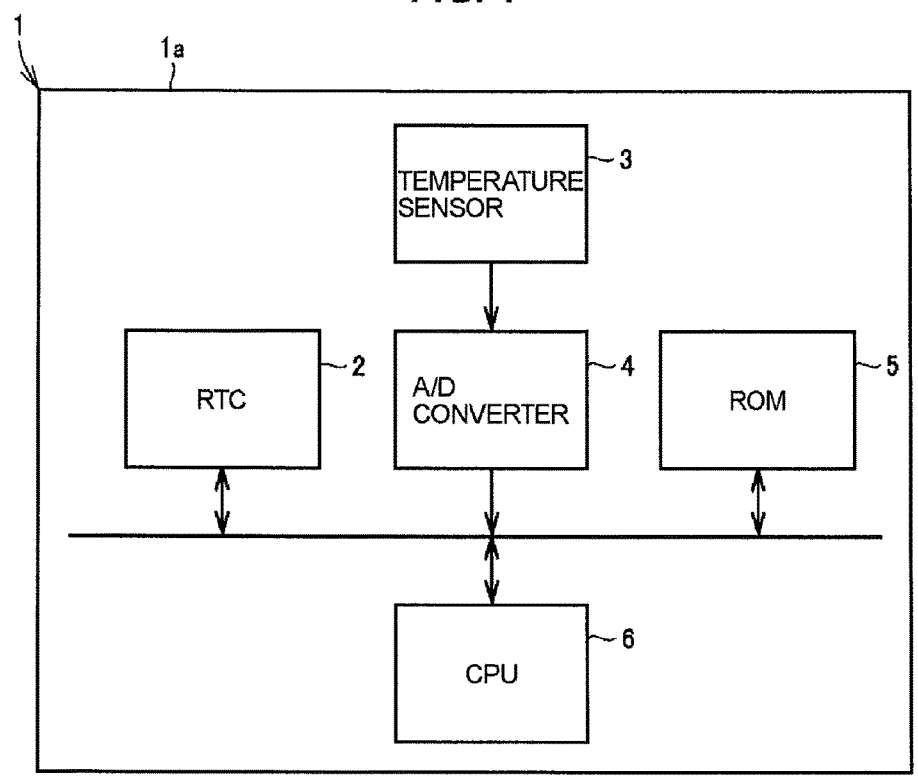
FIG. 1 is a block diagram illustrating the principal part of a microcomputer according to a first embodiment of the present application.

FIG. 1 is the block diagram illustrating a principal part of a microcomputer 1 according to a first embodiment of the present application. In FIG. 1, the microcomputer 1 includes a semiconductor substrate 1a, an RTC (Real Time Clock) 2 mounted on the surface thereof, a temperature sensor 3, an A/D (Analog-to-digital) converter 4, a ROM (Read Only Memory) 5, and a CPU (Central Processing Unit) 6.

The RTC 2 includes a crystal oscillator and outputs information indicative of time. The temperature sensor 3 outputs an analog signal whose voltage varies in proportion to the absolute temperature. The A/D converter 4 converts an analog signal generated by the temperature sensor 3 to a digital signal. The ROM 5 has stored therein a table indicating a relationship between the oscillation frequency of the crystal oscillator of the RTC 2 and temperature.

The CPU 6 corrects the RTC 2 on the basis of the temperature indicated by a digital signal from the A/D converter 4 and on the table in the ROM 5. Therefore, the RTC 2 outputs information that shows the correct time even if the temperature varies. The CPU 6 performs predetermined operations such as the calculation and processing of data, on the basis of the time information from the RTC 2.

Figure 2:
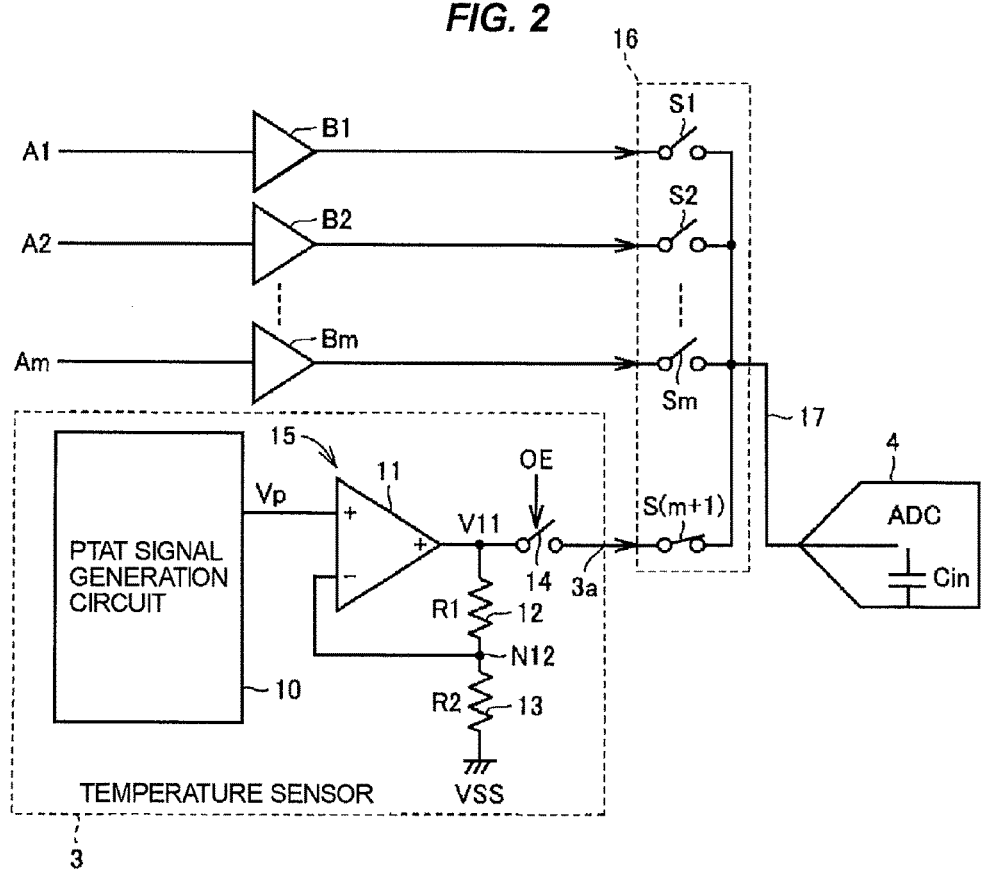
FIG. 2 is a circuit block diagram illustrating the configuration of a temperature sensor illustrated in FIG. 1 and a portion associated therewith.

FIG. 2 is a circuit block diagram illustrating the configuration of the temperature sensor 3 and the configuration of a portion associated therewith. In FIG. 2, the temperature sensor 3 includes a PTAT signal generation circuit 10, an operational amplifier 11, resistive elements 12 and 13, and a switch 14. The PTAT signal generation circuit 10 generates a PTAT signal whose voltage Vp varies in proportion to the absolute temperature. The operational amplifier 11, the resistive elements 12 and 13, and the switch 14 constitute an amplifier circuit 15 that amplifies the PTAT signal.

The PTAT signal is supplied to the non-inverting input terminal (positive terminal) of the operational amplifier 11. The resistive elements 12 and 13 are coupled in series between the output terminal of the operational amplifier 11 and a line of a ground voltage VSS. A node N12 between the resistive elements 12 and 13 is coupled to the inverting input terminal (negative terminal) of the operational amplifier 11. The resistive elements 12 and 13 constitute a voltage dividing circuit that divides the output voltage of the operational amplifier 11 and supplies the divided voltage to the inverting input terminal. The operational amplifier 11 outputs a current so that the voltage of the node N12 coincides with the voltage Vp of the PTAT signal. Accordingly, assuming that the resistance values of the resistive elements 12 and 13 are R1 and R2, respectively, then an output voltage V11 of the operational amplifier 11 is given by V11=Vp(R1+R2)/R2.

One-side terminal of the switch 14 is coupled to the output terminal of the operational amplifier 11, while the other-side terminal of the switch 14 is coupled to an output terminal 3a of the temperature sensor 3. The switch 14 is turned on when an output enabling signal OE is at an "H" level indicative of an activation level, and is turned off when the output enabling signal OE is at an "L" level indicative of a deactivation level.

In the microcomputer 1, the A/D converter 4 is used in order to A/D convert not only the output signal of the temperature sensor 3 but also other m analog signals A1 to Am (where m is an integer equal to or greater than 2).

That is, the microcomputer 1 includes m buffers B1 to Bm and a multiplexer 16. The m analog signals A1 to Am are supplied to the multiplexer 16 via the buffers B1 to Bm, respectively. The multiplexer 16 includes (m+1) switches S1 to S(m+1). One-side terminals of the switches S1 to S(m+1) receive the output signals of the buffers B1 to Bm and the output signal of the temperature sensor 3, respectively, and the other-side terminals are coupled to each other and are coupled to the input terminal of the A/D converter 4 via a wiring 17.

Any one switch S of the switches S1 to S(m+1) is turned on, and any one of the analog signals A1 to Am and the output signal of the temperature sensor 3 is supplied to the A/D converter 4. The A/D converter (ADC) 4 converts the analog signal supplied from the multiplexer 16 to a digital signal.

Figure 3:
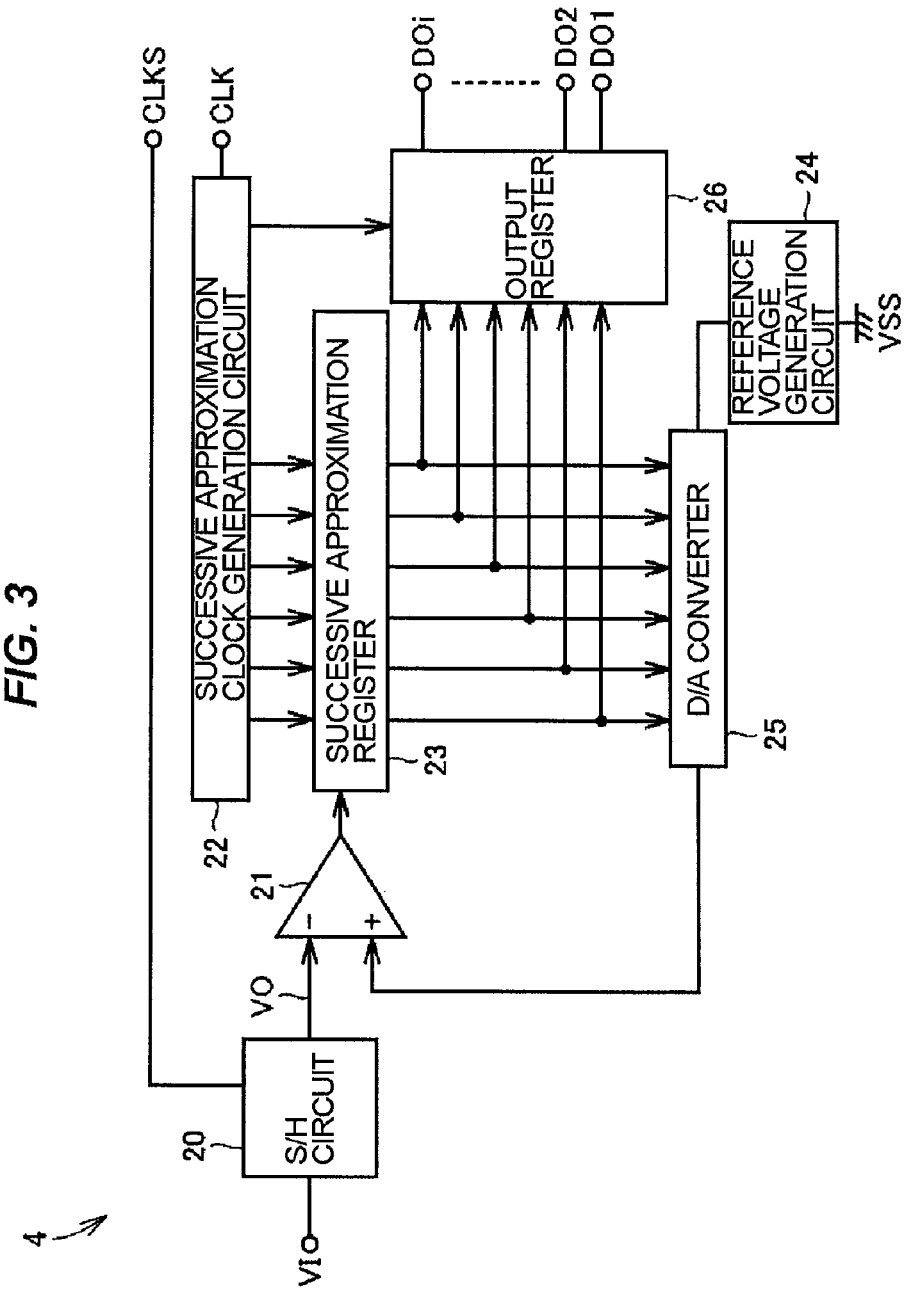
FIG. 3 is a block diagram illustrating the configuration of an A/D converter illustrated in FIG. 2.

FIG. 3 is a block diagram illustrating the configuration of the A/D converter 4. In FIG. 3, the A/D converter 4 includes a sample and hold circuit (S/H circuit) 20, a comparator 21, a successive approximation clock generation circuit 22, a successive approximation register 23, a reference voltage generation circuit 24, a D/A converter 25, and an output register 26.

Figure 4:
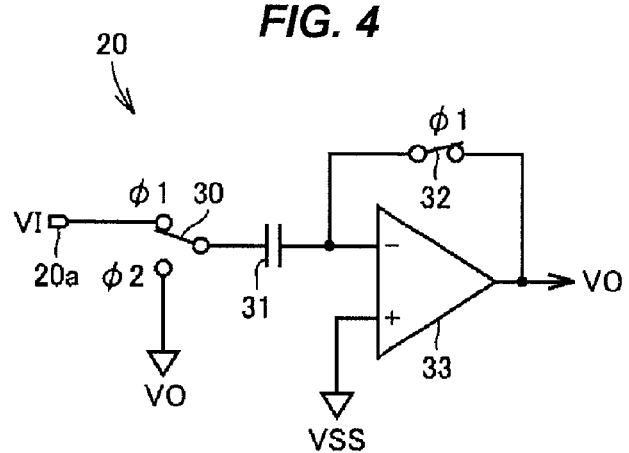
FIG. 4 is a circuit block diagram illustrating the configuration of a sample and hold circuit illustrated in FIG. 3.

The sample and hold circuit 20 takes in an input voltage VI (analog signal) in synchronization with a sampling clock signal CLKS. The sample and hold circuit 20 includes switches 30 and 32, a capacitor 31, and an operational amplifier 33 as illustrated in FIG. 4. A clock signal φ1 is the clock signal having the same phase as the phase of the sampling clock signal CLKS. Clock signals φ1 and φ2 are signals complementary to each other. The non-inverting input terminal (positive terminal) of the operational amplifier 33 receives the ground voltage VSS.

The switch 32 is coupled between the inverting input terminal (− terminal) and output terminal of the operational amplifier 33, and is turned on in a period during which the clock signal φ1 is at an "H" level, and is turned off in a period during which the clock signal φ2 is at an "H" level. One-side electrode of the capacitor 31 is coupled to the inverting input terminal of the operational amplifier 33. The switch 30 couples the other-side electrode of the capacitor 31 to an input terminal 20a in a period during which the clock signal φ1 is at an "H" level, and couples the other-side electrode of the capacitor 31 to the output terminal of the operational amplifier 33 in a period during which the clock signal φ2 is at an "H" level.

In a period during which the clock signal φ1 is at an "H" level, the capacitor 31 is coupled between the input terminal 20a and the inverting input terminal of the operational amplifier 33 by the switch 30, and at the same time, the inverting input terminal and output terminal of the operational amplifier 33 are shorted by the switch 32. In this case, the output voltage VO of the operational amplifier 33 is 0 V and the capacitor 31 is charged to the input voltage VI.

In a period during which the clock signal φ2 is at an "H" level, the capacitor 31 is coupled between the line of the output terminal of the operational amplifier 33 and the inverting input terminal of the operational amplifier 33 by the switch 30, and at the same time, the switch 32 is turned off. Therefore, the voltage of the inverting input terminal of the operational amplifier 33 remains OV and the output voltage VO of the operational amplifier 33 becomes VI.

Returning to FIG. 3, the comparator 21 compares the output voltage VO of the sample and hold circuit 20 with the voltage of a reference analog signal from the D/A converter 25, and outputs a signal indicative of the comparison result. The successive approximation clock generation circuit 22 generates a successive approximation clock signal in synchronization with the clock signal CLK, and supplies the same to the successive approximation register 23 and the output register 26. On the basis of the successive approximation clock signal and the output signal of the comparator 21, the successive approximation register 23 will determine digital signals Di to D1 (where "i" is an integer equal to or greater than 2) bit by bit.

The output register 26 outputs, when all bits are determined, the digital signals Di to D1 as the A/D conversion result. The reference voltage generation circuit 24 generates a reference voltage. The D/A converter 25 outputs a reference analog signal on the basis of the reference voltage from the reference voltage generation circuit 24 and the output signals D1 to Di of the successive approximation register 23.

When the maximum voltage of the reference analog signal is set to VFS, the D/A converter 25 first generates a voltage of VFS/2 equivalent to a half of the maximum voltage VFS. The output voltage VO of the sample and hold circuit 20 is compared with the output voltage VFS/2 of the D/A converter 25, and if VO>VFS/2 holds, the digital signal Di of the most significant bit is set to "1" while if VO<VFS/2 holds, the digital signal Di is set to "0".

Next, the D/A converter 25 generates, when Di=1 holds, a voltage of 3VFS/4 equal to ¾ times the VFS, and generates, when Di=0 holds, a voltage of VFS/4 equal to ¼ times the VFS. The output voltage VO of the sample and hold circuit 20 is compared with the output voltage of the D/A converter 25, and on the basis of the comparison result, the digital signal D(i−1) of the next bit is set to "1" or Hereinafter, in the same way, when the digital signals Di to D1 are determined, the digital signals Di to D1 are output from the output register 26 as the A/D conversion result.

Thus, a parasitic capacitance Cin of the A/D converter 4 including the capacitor 31 of the sample and hold circuit 20, a parasitic capacitance of the multiplexer 16, a parasitic capacitance of the wiring 17, and the like are coupled to the output terminal 3a of the temperature sensor 3, and thus the load capacitance value of the temperature sensor 3 increases considerably. Furthermore, when the output terminal 3a of the temperature sensor 3 is coupled to the A/D converter 4, the voltage of other analog signal A remains at the wiring 17 and the like. Therefore, after the output enabling signal OE is set to an "H" level to thereby turn on the switch 14 and the output terminal 3a of the temperature sensor 3 is coupled to the A/D converter 4 by means of the multiplexer 16, a predetermined settling time is necessary until the input voltage of the A/D converter 4 is stabilized.

Figure 5:
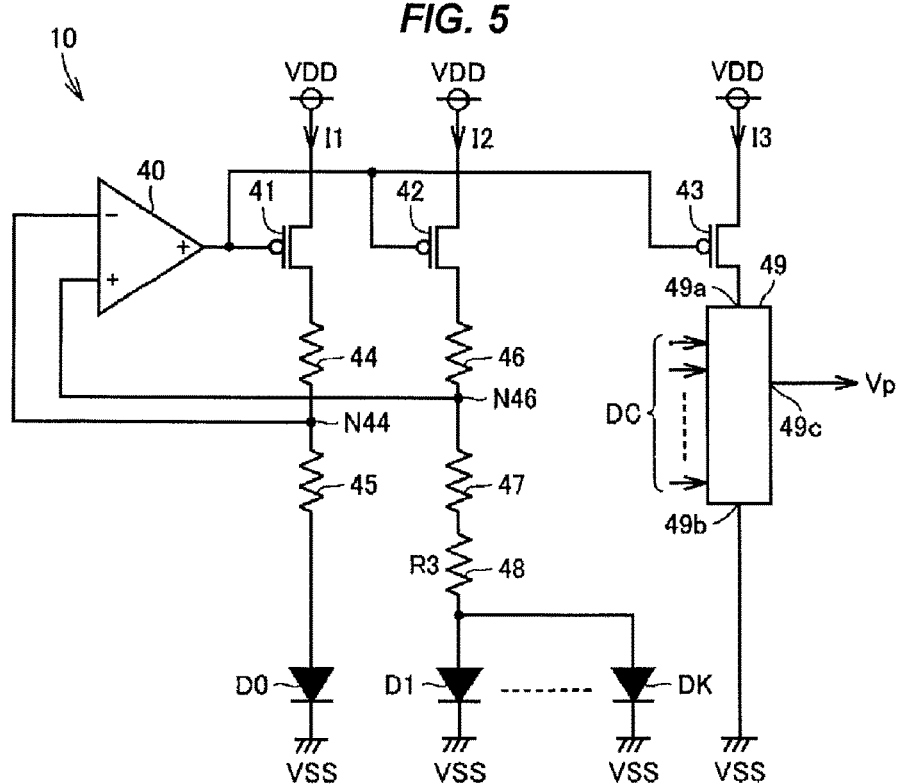
FIG. 5 is a circuit block diagram illustrating the configuration of a PTAT signal generation circuit illustrated in FIG. 2.

Hereinafter, the configuration of the temperature sensor 3 will be described in more detail. FIG. 5 is a circuit block diagram illustrating the configuration of the PTAT signal generation circuit 10. In FIG. 5, the PTAT signal generation circuit 10 includes an operational amplifier 40, P-channel MOS transistors 41 to 43, resistive elements 44 to 48, diodes D0 to DK (where K is an integer equal to or greater than 2), and a trimming circuit 49.

All the sources of the P-channel MOS transistors 41 to 43 are coupled to a line of a power source voltage VDD and all the gates thereof are coupled to the output terminal of the operational amplifier 40. The resistive elements 44 and 45 are coupled in series between the drain of the P-channel MOS transistor 41 and the anode of the diode D0, and the cathode of the diode D0 is coupled to the line of the ground voltage VSS. A node N44 between the resistive elements 44 and 45 is coupled to the inverting input terminal (negative terminal) of the operational amplifier 40.

The resistive element 46 to 48 are coupled in series between the drain of the P-channel MOS transistor 42 and the anodes of the diodes D1 to DK, and the cathodes of the diodes D1 to DK are coupled to the line of the ground voltage VSS. A node N46 between the resistive elements 46 and 47 is coupled to the non-inverting input terminal (positive terminal) of the operational amplifier 40.

The resistance values of the resistive elements 44 and 46 are the same, and the resistance values of the resistive elements 45 and 47 are the same. The sizes (that is, the current drive capabilities) of the diodes D0 to DK are the same. The diodes D1 to DK are coupled in parallel. Meanwhile, the K diodes D1 to DK may be replaced with one diode having K times the size (that is, the current drive capability) of the diode D0. Furthermore, in this case, K does not necessarily need to be an integer but may be a real number equal to or greater than 1.

The operational amplifier 40, the P-channel MOS transistors 41 and 42, and the resistive elements 44 and 46 constitute a current source that causes the voltage of the node N44 to coincide with the voltage of the node N46 and causes a current I1 flowing through the node N44 to coincide with a current I2 flowing through the node N46. I1=I2=I holds.

A voltage difference dVf=Vf1−Vf2 between a voltage Vf1 between the both terminals of the diode D0 and a voltage Vf2 between the both terminals of the diodes D1 to DK is expressed by Formula (1) below.

$$dVf = Vt \times \ln[I/Is] - Vt \times \ln[I/(K \times Is)] = Vt \times \ln(K) \quad (1)$$

Where $Vt = K_B \times T/q$ holds, Is is the saturation current of the diode D0, K×Is is the saturation current of the diodes D1 to DK, $K_B$ is the Boltzmann's factor, T is the absolute temperature, and q is the charge amount of an electron.

The voltage dVf is equal to the voltage between the both terminals of the resistive element 48, and thus if the resistance value of the resistive element 48 is represented by R3, Formula (2) holds.

$$I = dVf/R3 = Vt/R3 \times \ln(K) = [(K_B \times T)/(q \times R3)] \times \ln(K) \quad (2)$$

This current I results in a PTAT current proportional to the absolute temperature T.

Figure 6:
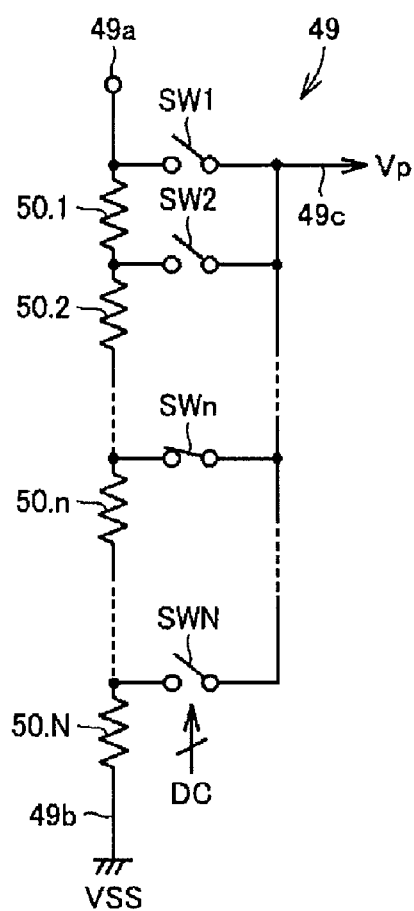
FIG. 6 is a circuit block diagram illustrating the configuration of a trimming circuit illustrated in FIG. 5.

Furthermore, one-side terminal 49a of the trimming circuit 49 is coupled to the drain of the P-channel MOS transistor 43, and other-side terminal 49b is coupled to the line of the ground voltage VSS. The trimming circuit 49 includes: N resistive elements 50.1 to 50.N coupled in series between the terminals 49a and 49b (where N is an integer equal to or greater than 2); and switches SW1 to SWN as illustrated in FIG. 6.

The one-side terminals of the switches SW1 to SWN are coupled to the terminals on the power source voltage VDD side (on the one-side terminal 49a side) of the resistive elements 50.1 to 50.N, respectively. All the other-side terminals of the switches SW1 to SWN are coupled to an output terminal 49c. In accordance with a trimming code DC, any one of the switches SW1 to SWN is turned on. The switches SW1 to SWN constitute a switch circuit that couples a selected terminal among the terminals on the power source voltage VDD side of the resistive element 50.1 to 50.N, to the output terminal 49c. FIG. 6 illustrates a state where the switch SWn (where n is an integer equal to or greater than 1 and equal to or less than N) is turned on.

Since the gates of the P-channel MOS transistors 41 to 43 are coupled to each other and the sizes of the P-channel MOS transistors 41 to 43 are the same, the currents I1 to I3 flowing through the P-channel MOS transistors 41 to 43 have the same value (I1=I2=I3=I). Assuming that the respective resistance values of the resistive elements 50.1 to 50.(N−1) are R4 and the resistance value of the resistive element 50.N is R5, then when the switch SWn is turned on, the voltage Vp of the PTAT signal is expressed by Formula (3) below.

$$Vp=I\times[R4\times(N-n)+R5] \quad (3)$$

That is, the trimming circuit 49 constitutes an output circuit that outputs, on the basis of the current I flowing through the diode D0 (namely, through the diodes D1 to DK), the voltage Vp proportional to the absolute temperature T. The trimming code DC is supplied so that Vp becomes a desired voltage level when the temperature is the reference temperature.

In the PTAT signal generation circuit 10 of FIG. 5, the voltages of the nodes N44 and N46 are set higher by providing the resistive elements 45 and 47. Therefore, the input terminal of the operational amplifier 40 can be the gate of an N-channel MOS transistor. The examples of the operational amplifier include an N-type operational amplifier whose input terminal is the gate of an N-channel MOS transistor and a P-type operational amplifier whose input terminal is the gate of a P-channel MOS transistor. The circuit area of the N-type operational amplifier is smaller than the circuit area of the P-type operational amplifier.

Figure 7:
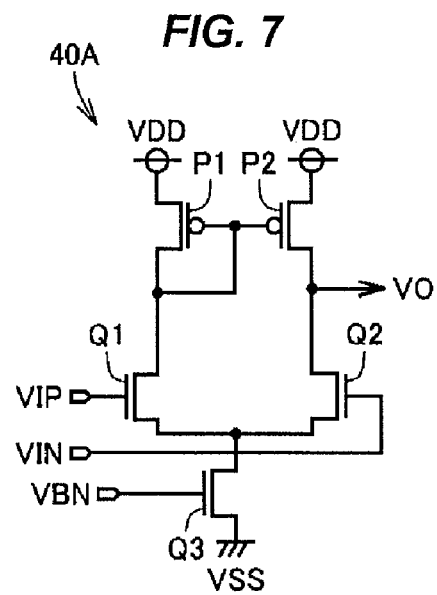
FIG. 7 is a circuit diagram illustrating the configuration of an operational amplifier illustrated in FIG. 5.

FIG. 7 is a circuit diagram illustrating the configuration of an N-type operational amplifier 40A. In FIG. 7, the operational amplifier 40A includes P-channel MOS transistors P1 and P2 and N-channel MOS transistors Q1 to Q3. The sources of the N-channel MOS transistors Q1 and Q2 are coupled to each other and coupled to the line of the ground voltage VSS via the N-channel MOS transistor Q3. The drains of the N-channel MOS transistors Q1 and Q2 are coupled to the line of the power source voltage VDD via the P-channel MOS transistors P1 and P2, respectively. Both the gates of the P-channel MOS transistors P1 and P2 are coupled to the drain of the P-channel MOS transistor P1.

The gates of the N-channel MOS transistors Q1 and Q2 serve as the non-inverting input terminal and the inverting input terminal, respectively, and receive voltages VIP and VIN, respectively. The drain of the N-channel MOS transistor Q2 serves as the output terminal and outputs a voltage VO. The gate of the N-channel MOS transistor Q3 receives a bias voltage VBN. The N-channel MOS transistor Q3 constitutes a constant current source.

When VIP>VIN holds, a current flowing through the transistors Q1, P1, and P2 becomes larger than a current flowing through the transistor Q2 and thus the output voltage VO rises. When VIP<VIN holds, the current flowing through the transistors Q1, P1, and P2 becomes smaller than the current flowing through the transistor Q2, and thus the output voltage VO falls.

Figure 8:
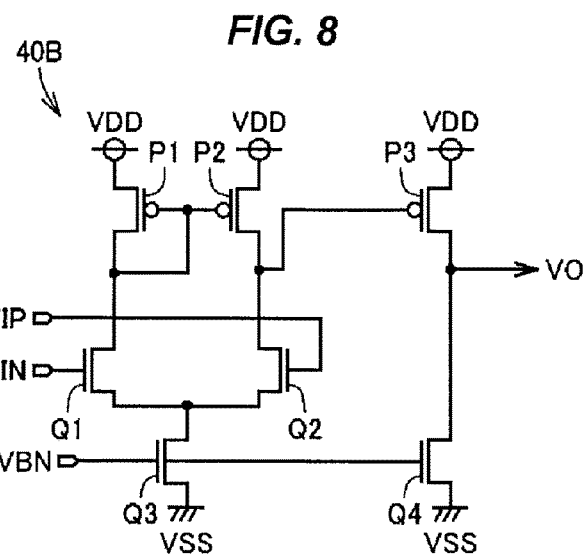
FIG. 8 is another circuit diagram illustrating the configuration of the operational amplifier illustrated in FIG. 5.

FIG. 8 is a circuit diagram illustrating the configuration of an N-type operational amplifier 40B. In FIG. 8, the operational amplifier 40B is the operational amplifier 40A of FIG. 7 with a P-channel MOS transistor P3 and an N-channel MOS transistor Q4 added. However, the gates of the N-channel MOS transistors Q1 and Q2 serve as the inverting input terminal and the non-inverting input terminal, respectively, and receive the voltages VIN and VIP, respectively.

The P-channel MOS transistor P3 and the N-channel MOS transistor Q4 are coupled in series between the line of the power source voltage VDD and the line of the ground voltage VSS. The gate of the P-channel MOS transistor P3 is coupled to the drain of the N-channel MOS transistor Q2. The drain of the P-channel MOS transistor P3 serves as the output terminal of the operational amplifier 40B and outputs the voltage VO. The gate of the N-channel MOS transistor Q4 receives the bias voltage VBN. The N-channel MOS transistor Q4 constitutes a constant current source.

When VIP>VIN holds, the current flowing through the transistors Q1, P1, and P2 becomes smaller than the current flowing through the transistor Q2, and thus the voltage of the drain of the transistor Q2 falls and the output voltage VO rises. When VIP<VIN holds, the current flowing through the transistors Q1, P1, and P2 becomes larger than the current flowing through the transistor Q2, and thus the voltage of the drain of the transistor Q2 rises and the output voltage VO falls.

Figure 9:
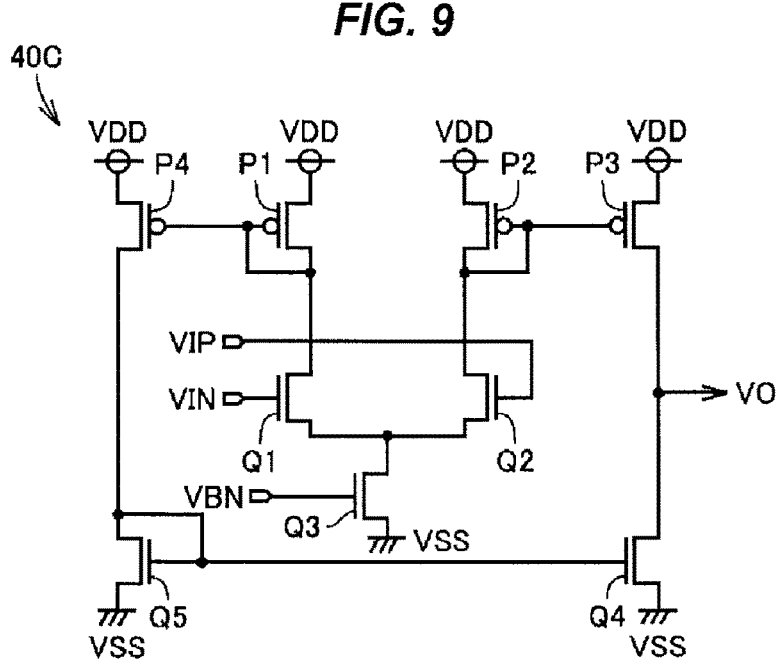
FIG. 9 is a yet another circuit diagram illustrating the configuration of the operational amplifier illustrated in FIG. 5.

FIG. 9 is a circuit diagram illustrating the configuration of an N-type operational amplifier 40C. In FIG. 9, the operational amplifier 40C is the operational amplifier 40B of FIG. 8 with a P-channel MOS transistor P4 and an N-channel MOS transistor Q5 added. However, the gate of the P-channel MOS transistor P2 is separated from the gate of the P-channel MOS transistor P1, and is coupled to the drain of the P-channel MOS transistor P2. Furthermore, the gate of the N-channel MOS transistor Q4 is coupled to the gate of the N-channel MOS transistor Q5 instead of receiving the bias voltage VBN.

The P-channel MOS transistor P4 and the N-channel MOS transistor Q5 are coupled in series between the line of the power source voltage VDD and the line of the ground voltage VSS. The gate of the P-channel MOS transistor P4 is coupled to the gate of the P-channel MOS transistor P1. The gate and drain of the N-channel MOS transistor Q5 are coupled to each other. Each of the transistors Q5, P1, and P2 constitutes a diode.

When VIP>VIN holds, a current flowing through the transistors Q1, P1, P4, Q5, and Q4 becomes smaller than the current flowing through the transistors Q2, P2, and P3, and thus the output voltage VO that is the voltage of the drain of the transistor P3 rises. When VIP<VIN holds, the current flowing through the transistors Q1, P1, P4, Q5, and Q4 becomes larger than the current flowing through the transistors Q2, P2, and P3, and thus the output voltage VO that is the voltage of the drain of the transistor P3 falls.

The operational amplifier 40 of FIG. 5 may be any of the operational amplifiers 40A, 40B, and 40C of FIG. 7 to FIG. 9. Meanwhile, the illustration of a phase compensation circuit is omitted in FIG. 7 to FIG. 9.

Figure 10:
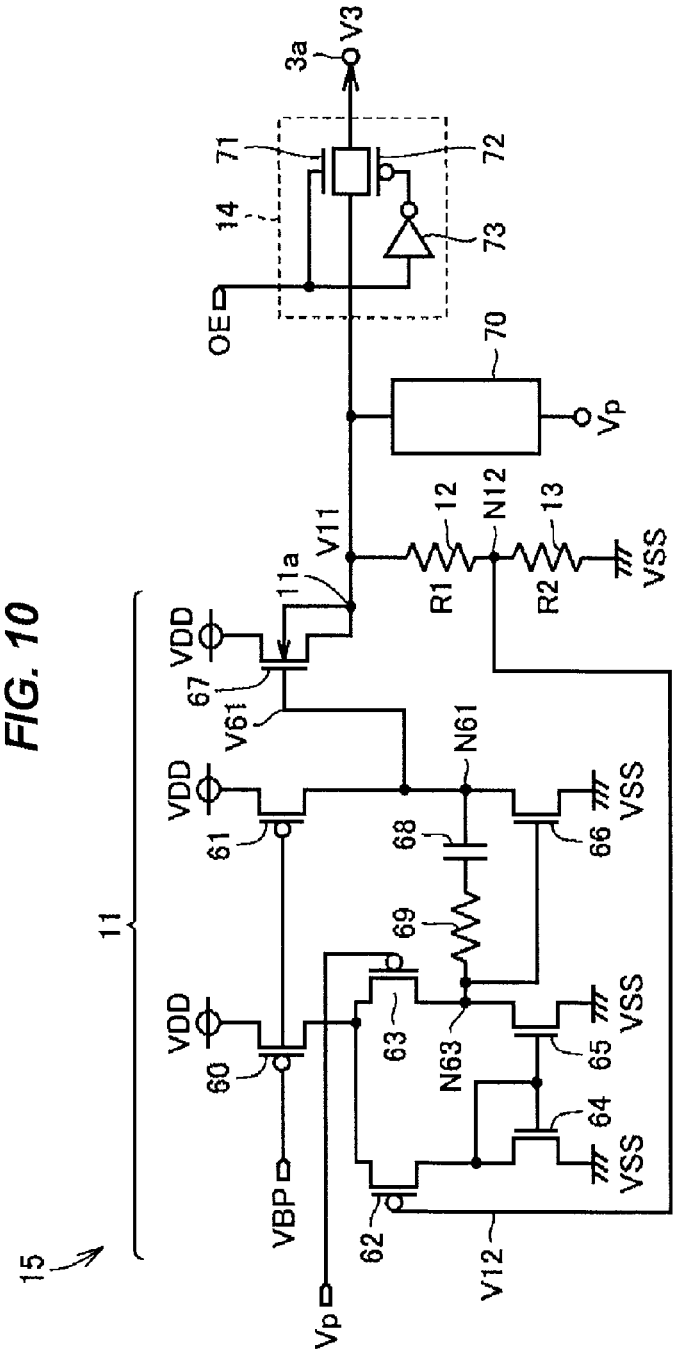
FIG. 10 is a circuit block diagram illustrating the configuration of an amplifier illustrated in FIG. 2.

FIG. 10 is a circuit block diagram illustrating the configuration of the amplifier circuit 15, which is illustrated in FIG. 2, in more detail. In FIG. 10, an operational amplifier 11 includes P-channel MOS transistors 60 to 63 and N-channel MOS transistors 64 to 67, a capacitor 68, and a resistive element 69.

The transistors 60, 62 and 64 are coupled in series between the line of the power source voltage VDD and the line of the ground voltage VSS. The transistors 63 and 65 are coupled in series between the drain of the transistor 60 and the line of the ground voltage VSS. Both the gates of the transistors 64 and 65 are coupled to the drain of the transistor 64.

The gate of the transistor 60 receives the bias voltage VBP. The transistor 60 constitutes a constant current source. The gate of the transistor 62 constitutes the inverting input terminal (negative terminal) of the operational amplifier 11 and receives a voltage V12 of a node N12 between the resistive elements 12 and 13. The gate of the transistor 63 constitutes the non-inverting input terminal (positive terminal) of the operational amplifier 11 and receives the voltage Vp of the PTAT signal. The transistors 60 and 62 to 65 constitute a P-type differential amplifier. A node N63 that is the drain of the transistor 63 serves as the output node of the P-type differential amplifier.

The transistors 61 and 66 are coupled in series between the line of the power source voltage VDD and the line of the ground voltage VSS. The gate of the transistor 61 receives the bias voltage VBP. The transistor 61 constitutes a constant current source. The gate of the transistor 66 is coupled to the node N63. The transistors 61 and 66 constitute a source ground amplifier. A node N61 that is the drain of the transistor 61 serves as the output node of the source ground amplifier.

The capacitor 68 and the resistive element 69 are coupled in series between the output nodes N61 and N63 and constitute a phase compensation circuit that prevents the occurrence of an oscillation phenomenon in the operational amplifier 11.

The gate of the transistor 67 is coupled to the node N61, the drain thereof is coupled to the line of the power source voltage VDD, and the source thereof is coupled to a back gate and serves as an output terminal 11a of the operational amplifier 11. The transistor 67 constitutes a source follower amplifier. In this manner, the operational amplifier 11 includes three stages of amplifiers of the differential amplifier, the source ground amplifier, and the source follower amplifier. The differential amplifier and the source ground amplifier increase a gain to thereby suppress the influence of an offset, and the source follower amplifier reduces the output impedance to thereby achieve a reduction of the settling time.

Here, the operation of the operational amplifier 11 will be described. When Vp>V12 holds, a current flowing through the transistors 62, 64, and 65 becomes larger than a current flowing through the transistor 63 and thus the node N63 becomes an "L" level. Therefore, a current flowing through the transistor 61 becomes larger than a current flowing through the transistor 66, the node N61 becomes an "H" level, and thus a current flowing through the transistor 67 increases and the output voltage V11 rises.

In an opposite manner, when VP<V12 holds, the current flowing through the transistors 62, 64, and 65 becomes smaller than the current flowing through the transistor 63 and thus the node N63 becomes an "H" level. Therefore, the current flowing through the transistor 61 becomes smaller than the current flowing through the transistor 66, the node N61 becomes an "L" level, the current flowing through the transistor 67 decreases, and the output voltage V11 falls. Accordingly, V12=Vp holds and V11=Vp(R1+R2)/R2 holds.

Incidentally, when the voltage V11 of the output terminal 11a is higher than a voltage difference (VDD−VTH) between the power source voltage VDD and the threshold voltage VTH of the transistor 67 (when V11>VDD−VTH holds), the transistor 67 is not conducted, and thus only the resistive elements 12 and 13 serve as the path for discharging the electric charge at the output terminal 11a. When the resistance values of the resistive elements 12 and 13 are reduced, the voltage V11 of the output terminal 11a can be decreased quickly but the power consumption increases.

Therefore, in the first embodiment, a variable conductance circuit 70 is coupled between the output terminal 11a of the operational amplifier 11 and the line of a reference voltage VP. The reference voltage VP is, for example, the ground voltage VSS or a voltage close to the ground voltage VSS. The variable conductance circuit 70 is a circuit for increasing the conductance between the output terminal 3a and the line of reference voltage VP and causing a current to flow from the output terminal 3a to the line of the reference voltage VP in a period during which the output voltage V11 of the operational amplifier 11 is higher than a voltage to be settled.

Figure 11:
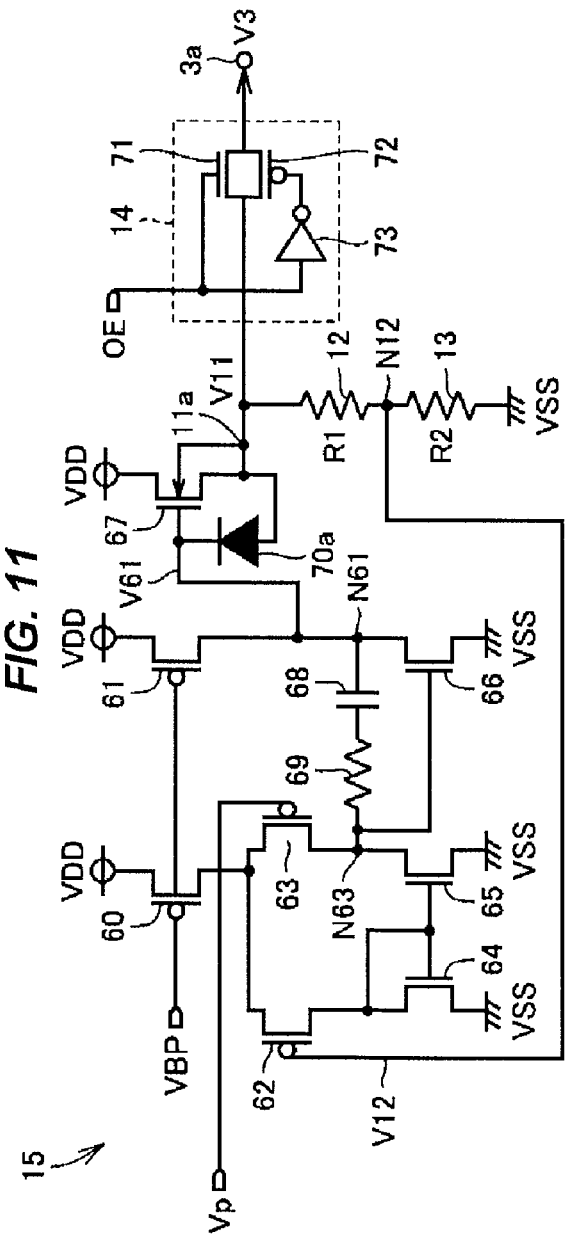
FIG. 11 is a circuit diagram illustrating the configuration of the amplifier illustrated in FIG. 2.

Specifically, the variable conductance circuit 70 includes a diode 70a as illustrated in FIG. 11. The anode of the diode 70a is coupled to the output terminal 11a and the cathode is coupled to the node N61. When the output terminal 11a is precharged to the power source voltage VDD, the diode 70a discharges an electric charge at the output terminal 11a, thereby causing the voltage V11 of the output terminal 11a to fall. When the voltage V11 at the output terminal 11a is higher than the voltage difference (VDD−VTH) between the power source voltage VDD and the threshold voltage VTH of the transistor 67 (when V11>VDD−VTH holds), the transistor 67 cannot be conducted. Therefore, the output terminal 11a is discharged by means of the diode 70a.

Meanwhile, V11>VDD−VTH holds, Vp<V12 is established, and thus the current flowing through the transistors 62, 64, and 65 becomes smaller than the current flowing through the transistor 63 and the node N63 becomes an "H" level and the transistor 66 is conducted. Accordingly, a current flows into the line of the ground voltage VSS via the diode 70a and the transistor 66 from the output terminal 11a, and thus the voltage V11 of the output terminal 11a falls.

In the case where the diode 70a is removed, when V11>VDD−VTH holds, the transistor 67 is not conducted even if the node N61 is set to an "H" level and thus only the resistive elements 12 and 13 serve as the path for discharging an electric charge at the output terminal 11a. When the resistance values of the resistive elements 12 and 13 are reduced, the voltage V11 of the output terminal 11a can be reduced quickly but the power consumption increases.

In contrast to this, in the first embodiment, since the diode 70a is provided, the voltage of the output terminal 11a can be quickly decreased and the settling time can be reduced, without setting the resistance values of the resistive elements 12 and 13 smaller.

The switch 14 includes an N-channel MOS transistor 71, a P-channel MOS transistor 72, and an inverter 73. The transistors 71 and 72 are coupled in parallel between the output terminals 11a and 3a. The output enabling signal OE is supplied directly to the gate of the transistor 71 and at the same time inverted by the inverter 73 and supplied to the gate of the transistor 72.

When the output enabling signal OE is at an "H" level, the transistors 71 and 72 are conducted to each other and the output voltage V11 of the operational amplifier 11 is output to the output terminal 3a. When the output enabling signal OE is at an "L" level, the transistors 71 and 72 become non-conductive and the output voltage V11 of the operational amplifier 11 is not output to the output terminal 3a.

Figure 12:
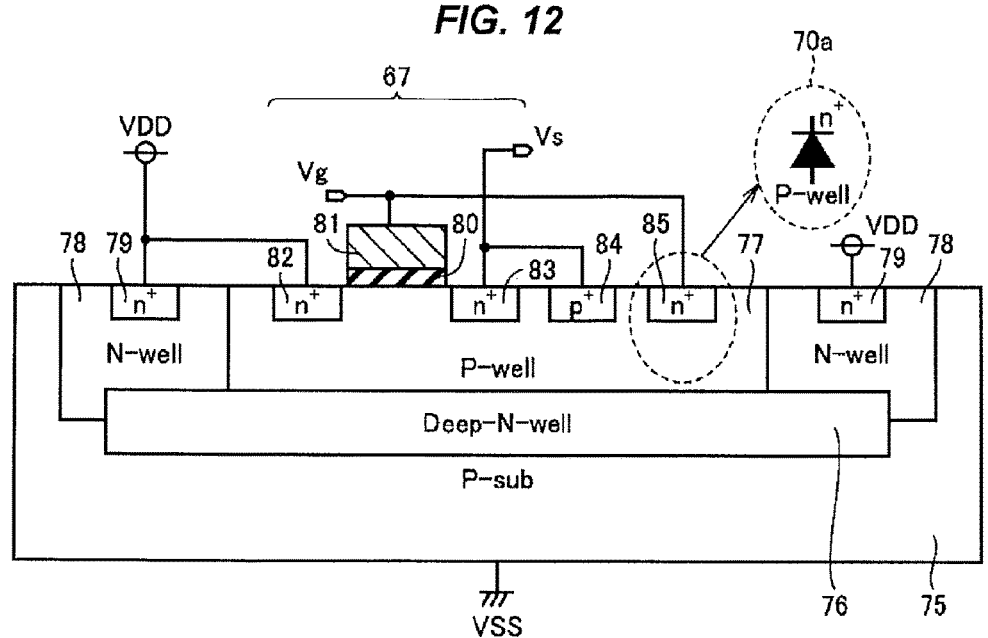
FIG. 12 is a cross sectional view illustrating the structure of a transistor and diode illustrated in FIG. 11.

FIG. 12 is a cross-sectional view showing the configuration of the N-channel MOS transistor 67 and diode 70a of FIG. 11. In FIG. 12, a deep N-well 76 is formed on the surface of a P-type silicon substrate 75, a P-well 77 is formed on the surface of the deep N-well 76, an N-well 78 is formed around the P-well 77, and an $N^+$-type impurity diffusion region 79 is formed on the surface of the N-well 78.

The P-type silicon substrate 75 receives the ground voltage VSS, the $N^+$-type impurity diffusion region 79 receives the power source voltage VDD, and the PN junction between the P-type silicon substrate 75 and the N-well 78 is maintained in a reverse bias state, and the PN junction between the P-type silicon substrate 75 and the deep N-well 76 is maintained in a reverse bias state.

Furthermore, a gate insulating film 80 and a gate electrode 81 are stacked over the surface of the P-well 77, an $N^+$-type impurity diffusion region 82 is formed on one side of the gate electrode 81, and an $N^+$-type impurity diffusion region 83 is formed on the other side of the gate electrode 81. On the surface of the P-well 77, a $P^+$-type impurity diffusion region 84 is formed adjacent of the $N^+$-type impurity diffusion region 83 and an $N^+$-type impurity diffusion region 85 is formed adjacent to the $P^+$-type impurity diffusion region 84.

The gate electrode 81, the $N^+$-type impurity diffusion region 82, the $N^+$-type impurity diffusion region 83, and the P-well 77 constitute the gate, the drain, the source, and the back gate of the N-channel MOS transistor 67, respectively. The P-well 77 and the $N^+$-type impurity diffusion region 85 constitute the anode and the cathode of the diode 70a, respectively.

The $N^+$-type impurity diffusion region 85 (the cathode of the diode 70a) is coupled to the gate electrode 81 (the gate of the transistor 67). The $P^+$-type impurity diffusion region 84 is coupled to the $N^+$-type impurity diffusion region 83, thus the back gate (P-well 77) of the transistor 67 is coupled to the source ($N^+$-type impurity diffusion region 83), and thereby the threshold voltage VTH of the transistor 67 is prevented from increasing due to the back gate effect. In addition, the drain ($N^+$-type impurity diffusion region 82) of the transistor 67 receives the power source voltage VDD.

Figure 13:
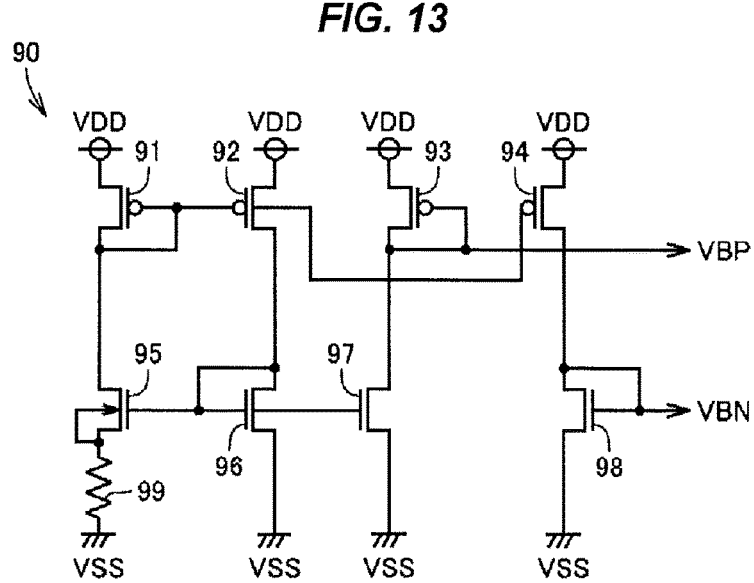
FIG. 13 is a circuit diagram illustrating the configuration of a bias voltage generation circuit that generates a bias voltage VBN of FIG. 7 to FIG. 9 and a bias voltage VBP of FIG. 10 and FIG. 11.

FIG. 13 is a circuit diagram illustrating the configuration of a bias voltage generation circuit 90 that generates the bias voltage VBN of FIG. 7 to FIG. 9 and the bias voltage VBP of FIG. 10 and FIG. 11. In FIG. 13, the bias voltage generation circuit 90 includes P-channel MOS transistors 91 to 94, N-channel MOS transistors 95 to 98, and a resistive element 99. The transistors 91 and 95 and the resistive element 99, the transistors 92 and 96, the transistors 93 and 97, and the transistors 94 and 98 are coupled in series between the line of the power source voltage VDD and the line of the ground voltage VSS, respectively.

All the gates of the transistors 91, 92, and 94 are coupled to the drain of the transistor 91. The gate and drain of the transistor 93 are coupled to each other. All the gates of the transistors 95, 96, and 97 are coupled to the drain of the transistor 96. The gate and drain of the transistor are coupled to each other. A current of a value corresponding to the resistance value of the resistive element 99 flows through the transistors 91 and 95 and the resistive element 99. A current of the same value flows through the transistors 91 to 98. The drain voltage of the transistor 93 serves as the bias voltage VBP and the drain voltage of the transistor 98 serves as the bias voltage VBN.

Figure 14:
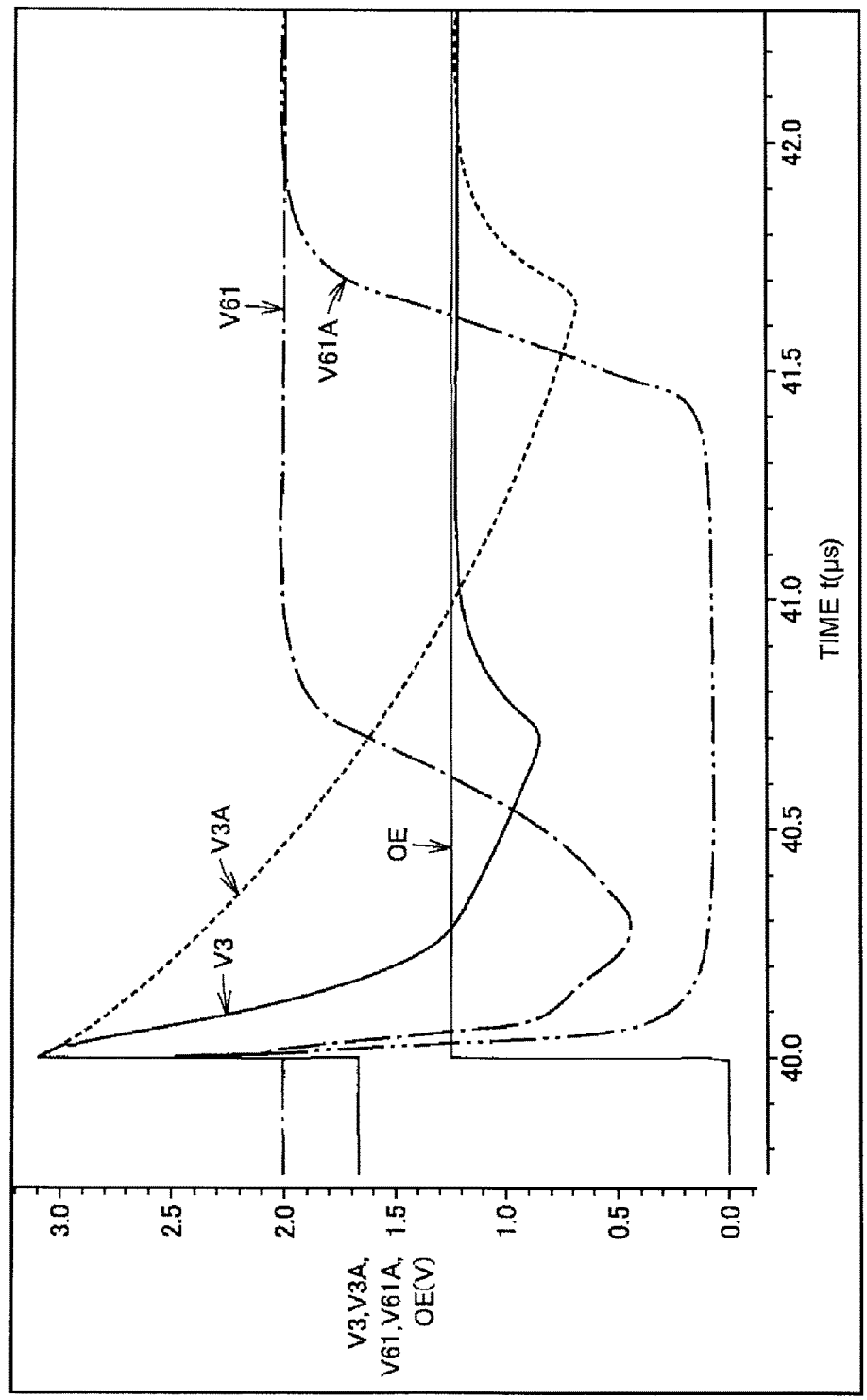
FIG. 14 is a time chart for illustrating an effect of the diode illustrated in FIG. 11.

Next, the effect of the diode 70a will be described. FIG. 14 is a time chart for comparing an output voltage V3 of the temperature sensor 3 and a gate voltage V61 of the transistor 67 when there is the diode 70a with an output voltage V3A of a temperature sensor 3A and a gate voltage V61A of the transistor 67 when the diode 70a is removed.

In FIG. 14, there are illustrated the waveforms of the voltages V3, V3A, V61, and V61A and the signal OE when the signal OE is raised from an "L" level to an "H" level at a certain time (40 μs in the drawing) and then instantaneously the output terminal 3a of the temperature sensor 3 is precharged to the power source voltage VDD and thereafter only the operational amplifier 11 drives the output terminal 3a of the temperature sensor 3.

Meanwhile, the "L" level of the signal OE in FIG. 14 is 0 V and the "H" level is 1.25 V. The signal OE of FIG. 14, the "H" level of which is raised to the power source voltage VDD (3.3 V) by means of a level shifter (not shown), serves as the output enabling signal OE of FIG. 11. Because the delay time of the level shifter (not shown) is in the order of ns, the difference in timing between the output enabling signal OE of FIG. 11 and the signal OE of FIG. 14 is indistinguishably small.

When there is no diode 70a, the gate voltage V61A of the transistor 67 drops to a voltage close to the ground voltage VSS immediately after the signal OE is set to an "H" level, but since the transistor 67 is not conducted, the output voltage V3A of the temperature sensor 3 decreases slowly. Furthermore, since the gate voltage V61A of the transistor 67 drops excessively, the output voltage V3A passes over a voltage to be settled and continues to decrease for a while. When the gate voltage V61A rises, the output voltage V3A finally starts to rise and slightly overshoots the voltage to be settled and then performs settling.

In contrast to this, when there is the diode 70a, the gate voltage V61 of the transistor 67 decreases immediately after the signal OE is set to an "H" level, but the decreasing speed is slower than the gate voltage V61A when there is no diode 70a, and the gate voltage V61 starts to rise at a voltage higher than the gate voltage V61A does. Furthermore, since an electric charge at the output terminal 3a of the temperature sensor 3 is discharged to the node N61 (the gate of the transistor 67) via the diode 70a, the output voltage V3 decreases more rapidly than the output voltage V3A. In addition, when V61 becomes higher by the threshold voltage VTH than V3, the voltage V3 starts to rise and then becomes stable at the voltage to be settled.

As described above, in the first embodiment, since the diode 70a is coupled between the source and gate of the transistor 67 of the operational amplifier 11, the number of discharge paths of the output terminal 3a increases when an initial value of the voltage V3 of the output terminal 3a of the temperature sensor 3 is higher than VDD-VTH. Accordingly, a reduction of the settling time of the output voltage V3 of the temperature sensor 3 can be achieved.

Second Embodiment

Figure 15:
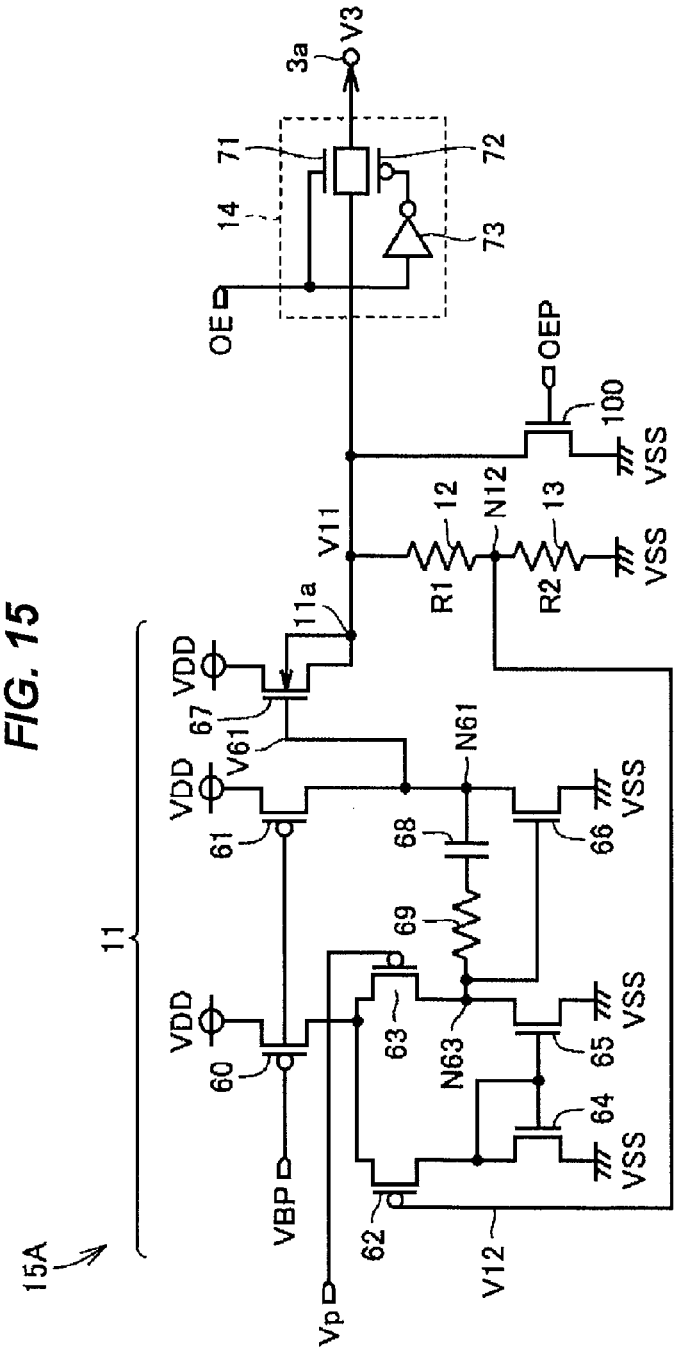
FIG. 15 is a circuit diagram illustrating the configuration of an amplifier of a temperature sensor included in a microcomputer according to a second embodiment of the present application.

FIG. 15 is a circuit diagram illustrating the configuration of an amplifier circuit 15A of a temperature sensor included in a microcomputer according to a second embodiment of the present application, and is the diagram to be compared with FIG. 11. Referring to FIG. 15, this amplifier circuit differs from the amplifier circuit 15 of FIG. 11 in that the diode 70a is replaced with an N-channel MOS transistor 100.

The transistor 100 is coupled between the output terminal 11a of the operational amplifier 11 and the line of the ground voltage VSS, and the gate thereof receives a pulse signal OEP. The transistor 100 constitutes a variable conductance circuit.

Figure 16:
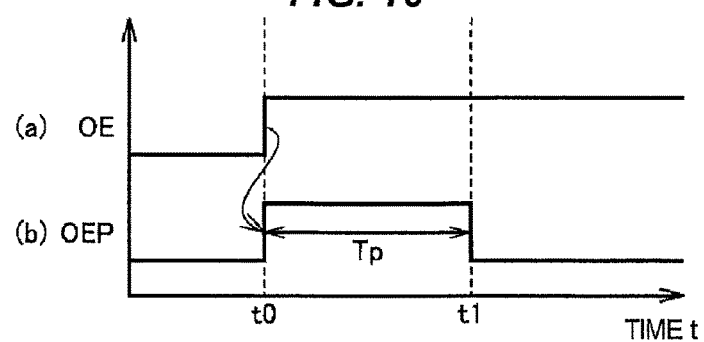
FIG. 16 is a time chart illustrating the operation of the amplifier illustrated in FIG. 15.

FIGS. 16A and 16B are the time charts illustrating the operation of the amplifier circuit 15A of FIG. 15. In particular, FIG. 16A illustrates the waveform of the output enabling signal OE and FIG. 16B illustrates the waveform of the pulse signal OEP. In FIG. 15 and FIGS. 16A and 16B, in the initial state, the output terminal 3a of the temperature sensor is precharged to the power source voltage VDD and both the signals OE and OEP are set to an "L" level. Accordingly, both the switch 14 and the transistor 100 are non-conductive.

When the signal OE is raised from an "L" level to an "H" level at a certain time t0, the switch 14 is conducted, a current flows from the output terminal 3a to the output terminal 11a of the operational amplifier 11, and the voltage V11 of the output terminal 11a rises to the power source voltage VDD. At the same time, the pulse signal OEP is raised from an "L" level to an "H" level, the transistor 100 is conducted, and the voltage V11 falls. At a time t1 when a predetermined time Tp has elapsed from the time t0, the pulse signal OEP is dropped to an "L" level, the transistor 100 becomes non-conductive, and the falling of the voltage V11 is stopped.

The size (i.e., the current drive capability) of the transistor 100 and the conduction time Tp thereof are set in advance so that the voltage V11 becomes approximately Vp(R1+R2)/R2. Accordingly, also with the second embodiment, the settling time of the output voltage V3 of the temperature sensor 3 can be reduced.

Third Embodiment

Figure 17:
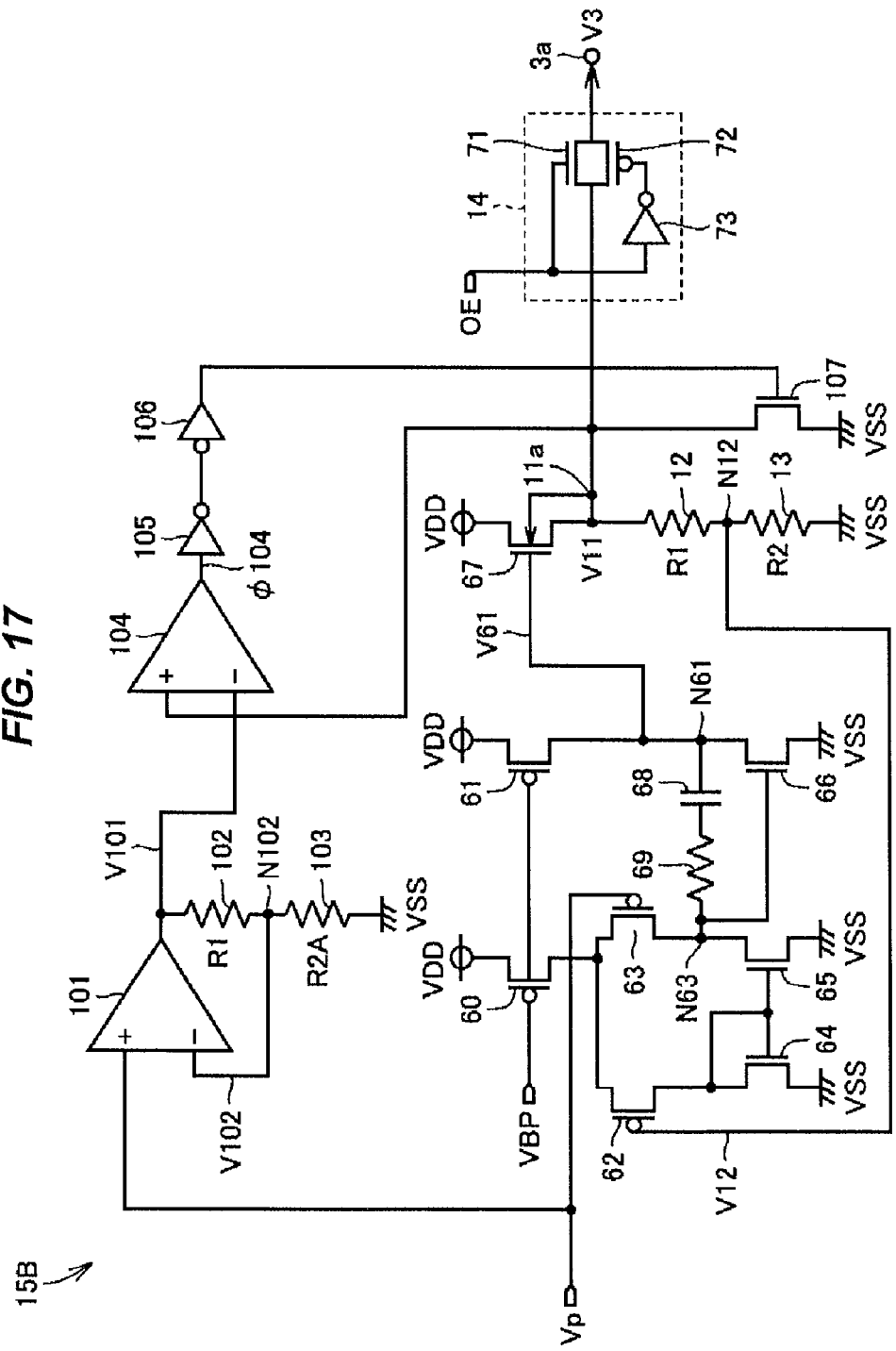
FIG. 17 is a circuit diagram illustrating the configuration of an amplifier circuit of a temperature sensor included in a microcomputer according to a third embodiment of the present application.

FIG. 17 is a circuit diagram illustrating the configuration of an amplifier circuit 15B of a temperature sensor included in a microcomputer according to a third embodiment of the present application, and is the diagram to be compared with FIG. 15. Referring to FIG. 17, the amplifier circuit 15B differs from the amplifier circuit 15A of FIG. 15 in that the variable conductance circuit is constituted by operational amplifiers 101 and 104, resistive elements 102 and 103, inverters 1105 and 106, and an N-channel MOS transistor 107 instead of being constituted by the N-channel MOS transistor 100.

The resistive elements 102 and 103 are coupled in series between the output terminal of the operational amplifier 101 and the line of the ground voltage VSS. A voltage V102 of a node N102 between the resistive elements 102 and 103 is supplied to the inverting input terminal (negative terminal) of the operational amplifier 101. The non-inverting input terminal (positive terminal) of the operational amplifier 101 receives the voltage Vp of the PTAT signal. A resistance value R1 of the resistive element 102 is the same as the resistance value R1 of the resistive element 12. A resistance value R2A of the resistive element 103 is slightly smaller than a resistance value R2 of the resistive element 13.

The operational amplifier 101 outputs a current so that the voltage V102 coincides with the voltage Vp. Accordingly, an output voltage V101 of the operational amplifier 101 results in V101=Vp(1+R1/R2A), which is slightly larger than a voltage V11=Vp(1+R1/R2) the output voltage V11 of the operational amplifier 11 should settle.

The inverting input terminal (negative terminal) of the operational amplifier 104 receives the output voltage V101 of the operational amplifier 101, and the non-inverting input terminal (positive terminal) of the operational amplifier 104 receives the output voltage V11 of the operational amplifier 11. An output signal φ104 of the operational amplifier 104 is supplied to the gate of the transistor 107 via the inverters 105 and 106. The transistor 107 is coupled between the output terminal 11a of the operational amplifier 11 and the line of the ground voltage VSS.

When the voltage V11 of the output terminal 11a is higher than V101, the output signal φ104 of the operational amplifier 104 becomes an "H" level, the transistor 107 is conducted, and the voltage V11 falls. When the voltage V11 of the output terminal 11a is lower than V101, the output signal φ104 of the operational amplifier 104 becomes an "L" level and the transistor 107 becomes non-conductive. The size (i.e., the current drive capability) of the transistor 107 is set to a value appropriate for causing the voltage V11 to fall.

Accordingly, in the third embodiment, even when the switch 14 is conducted and the voltage V11 becomes the power source voltage VDD, the voltage V11 can be dropped to a voltage slightly higher than the voltage Vp of the PTAT signal by conducting the transistor 107. Therefore, the settling time of the output voltage V3 of the temperature sensor 3 can be reduced.

Fourth Embodiment

Figure 18:
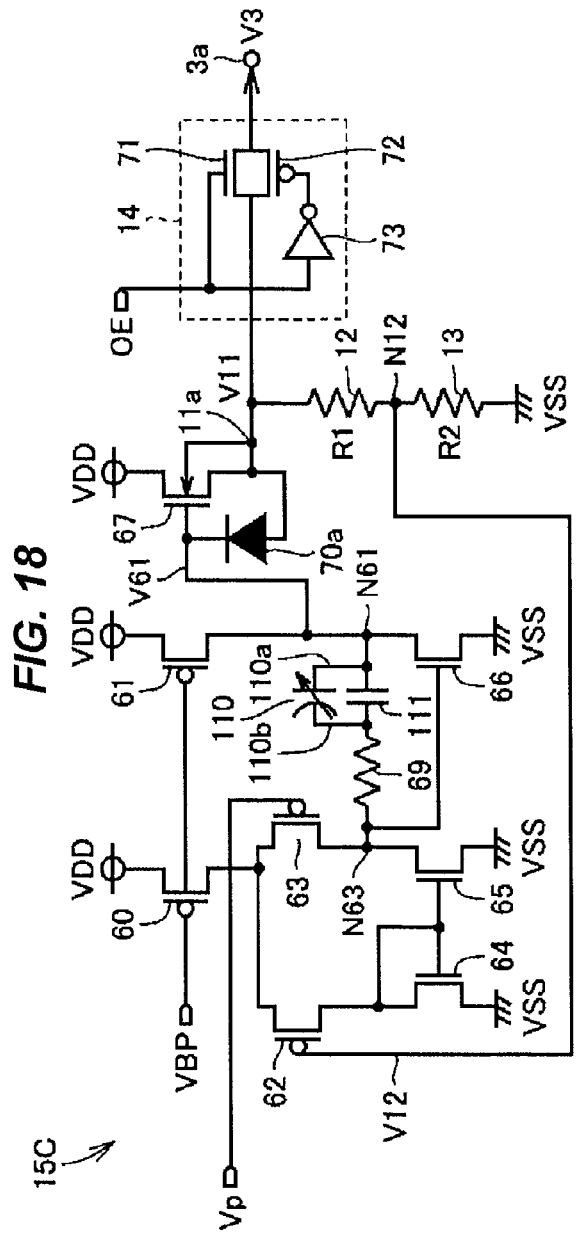
FIG. 18 is a circuit diagram illustrating the structure of an amplifier circuit of a temperature sensor included in a microcomputer according to a fourth embodiment of the present application.

FIG. 18 is a circuit diagram illustrating the configuration of an amplifier circuit 15C of a temperature sensor included in a microcomputer according to a fourth embodiment of the present application, and is the diagram to be compared with FIG. 11. Referring to FIG. 18, the amplifier circuit 15C differs from the amplifier circuit 15 of FIG. 11 in that the capacitor 68 of the phase compensation circuit is replaced with a parallel connection of a varactor capacitive element 110 and a capacitor 111. A positive terminal 110a of the varactor capacitive element 110 is coupled to the node N61, and a negative terminal 110b of the varactor capacitive element 110 is coupled to the node N63 via the resistive element 69. The capacitance value between the terminals 110a and 110b of the varactor capacitive element 110 varies depending on the polarity of the voltage between the terminals 110a and 110b and the magnitude thereof.

Figure 19:
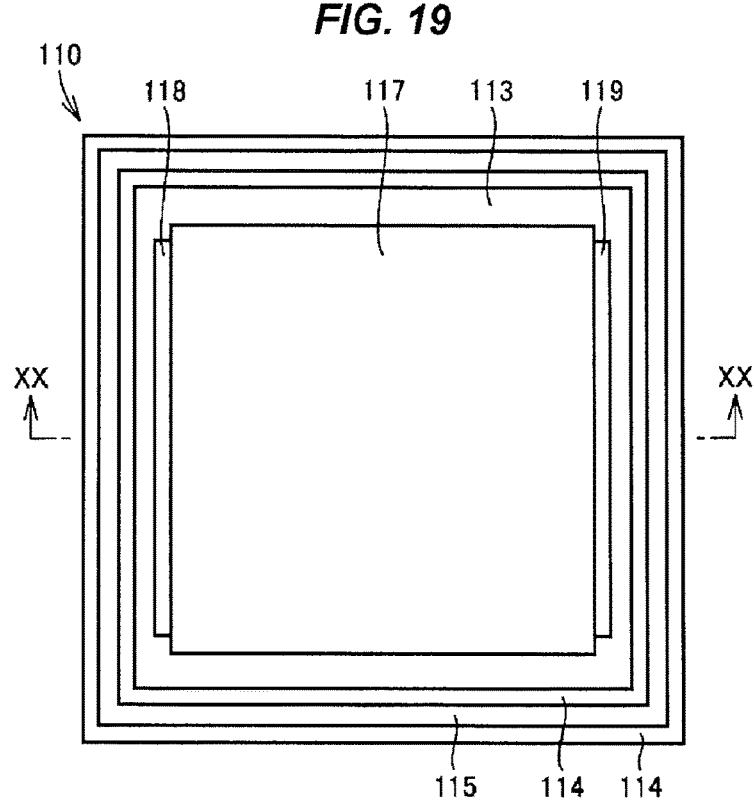
FIG. 19 is a plan view illustrating the structure of a varactor capacitive element illustrated in FIG. 18.
Figure 20:
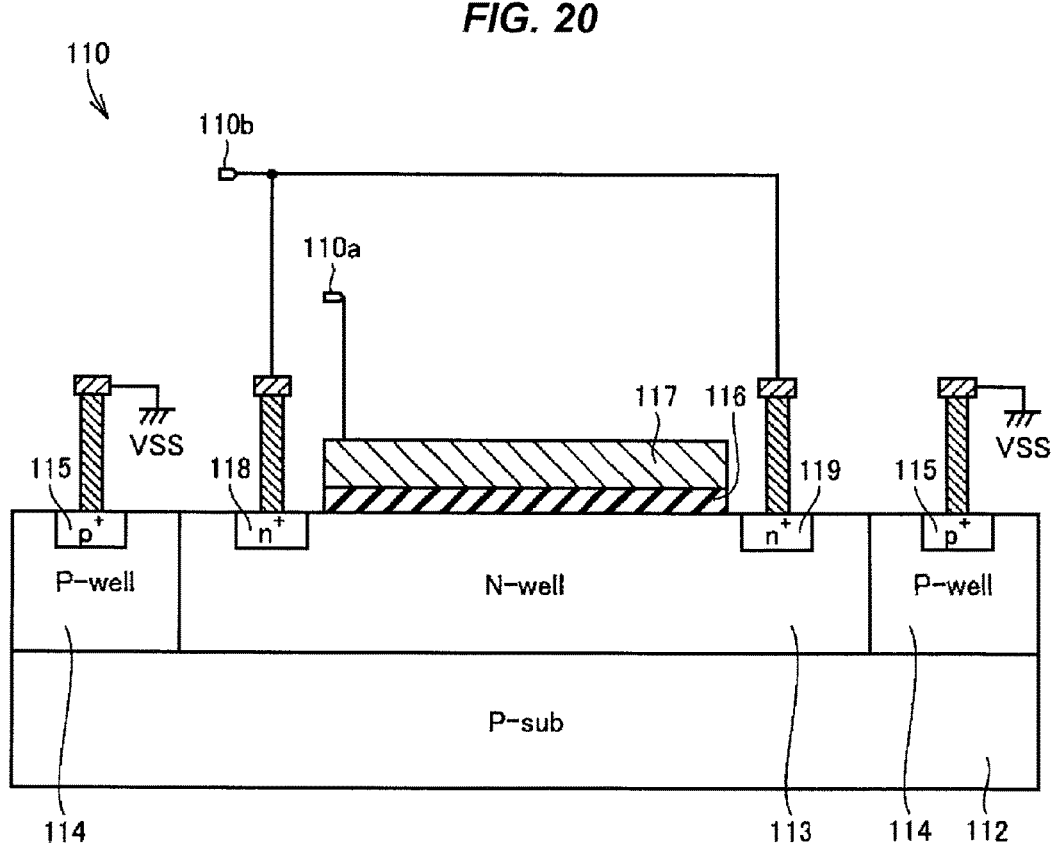
FIG. 20 is a cross sectional view along an XX-XX line of FIG. 19.

FIG. 19 is a plan view illustrating the structure of the varactor capacitive element 110, and FIG. 20 is a cross sectional view along an XX-XX line of FIG. 19. In FIG. 19 and FIG. 20, a square-shaped N-well 113 is formed on the surface of a P-type silicon substrate 112, a P-well 114 is formed around the N-well 113, a square and annular-shaped P$^+$-type impurity diffusion region 115 is formed on the surface of the P-well 114, and a P$^+$-type impurity diffusion region 115 is coupled to the line of the ground voltage VSS.

In addition, a square-shaped gate insulating film 116 and gate electrode 117 are stacked over the surface of the N-well 113, and the gate electrode 117 is coupled to the positive terminal 110a. Furthermore, a strip-shaped N$^+$-type impurity diffusion region (source) 118 is formed on the surface of the N-well 113 on one side of the gate electrode 117, a strip-shaped N$^+$-type impurity diffusion region (drain) 119 is formed on the surface of the N-well 113 on the other side of the gate electrode 117, and both the N$^+$-type impurity diffusion regions 118 and 119 are coupled to the negative terminal 110b.

Figure 21:
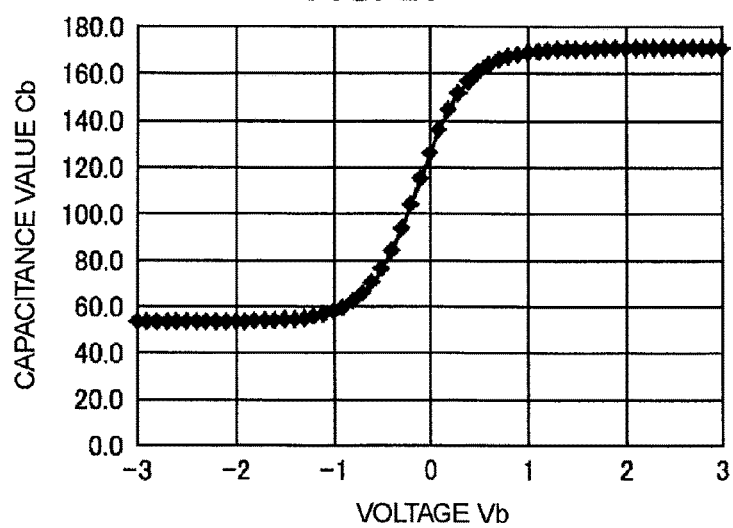
FIG. 21 is a graph illustrating a voltage dependence of the capacitance value of the varactor capacitive element illustrated in FIG. 18.

FIG. 21 is a graph illustrating the voltage dependence of the capacitance value of the varactor capacitive element 110, in which the horizontal axis represents a voltage Vb (in an arbitrary unit) between the terminals 110a and 110b of the varactor capacitive element 110, while the vertical axis represents a capacitance value Cb (in an arbitrary unit) between the terminals 110a and 110b of the varactor capacitive element 110. FIG. 21 illustrates a relationship between the voltage Vb and the capacitance value Cb when the negative terminal 110b is fixed to 0 V and the positive terminal 110a is varied from −3 to +3 (in an arbitrary unit).

In FIG. 21, when the voltage Vb becomes equal to or greater than +1, electrons are attracted to a vicinity of the gate insulating film 116 to form an N-type inversion layer from a source 118 and drain 119 to directly under the gate insulating film 116, thereby forming a capacitor constituted of the gate electrode 117, the inversion layer, and the gate insulating film 116 therebetween. Accordingly, when the voltage Vb becomes equal to or greater than +1, the capacitance value Cb of the varactor capacitive element 110 becomes approximately 170 that is the maximum value, and the capacitance value Cb has no longer a voltage dependence.

In addition, as the voltage Vb is decreased from +1, the capacitance value Cb gradually decreases until the voltage Vb reaches −1. When the voltage Vb is equal to or greater than +1, the inversion layer is formed so as to be in contact with the lower surface of the gate insulating film 116. However, when the voltage Vb is between +1 to −1, a depletion layer is formed between the lower surface of the gate insulating film 116 and the inversion layer and the capacitance value Cb decreases. When the voltage Vb is reduced to −1 or less, the inversion layer under the gate insulating film 116 is eliminated, the capacitance value Cb becomes approximately 55 that is the minimum value, and the capacitance value Cb has no longer a voltage dependence.

For example, a sum of the capacitance value Cb when the voltage Vb between the terminals 110a and 110b of the varactor capacitive element 110 is 0 V and the capacitance value of the capacitor 111 is set so as to be the same as the capacitance value of the capacitor 68.

A MOM (Metal Oxide Metal) capacitive element, a MIM (Metal Insulator Metal) capacitive element, or a PIP (Poly Insulator Poly) capacitive element that does not have a voltage dependence of the capacitance value is used as the capacitor 111. Here, there will be described a case where the MOM capacitive element is employed as the capacitor 111.

Figure 22:
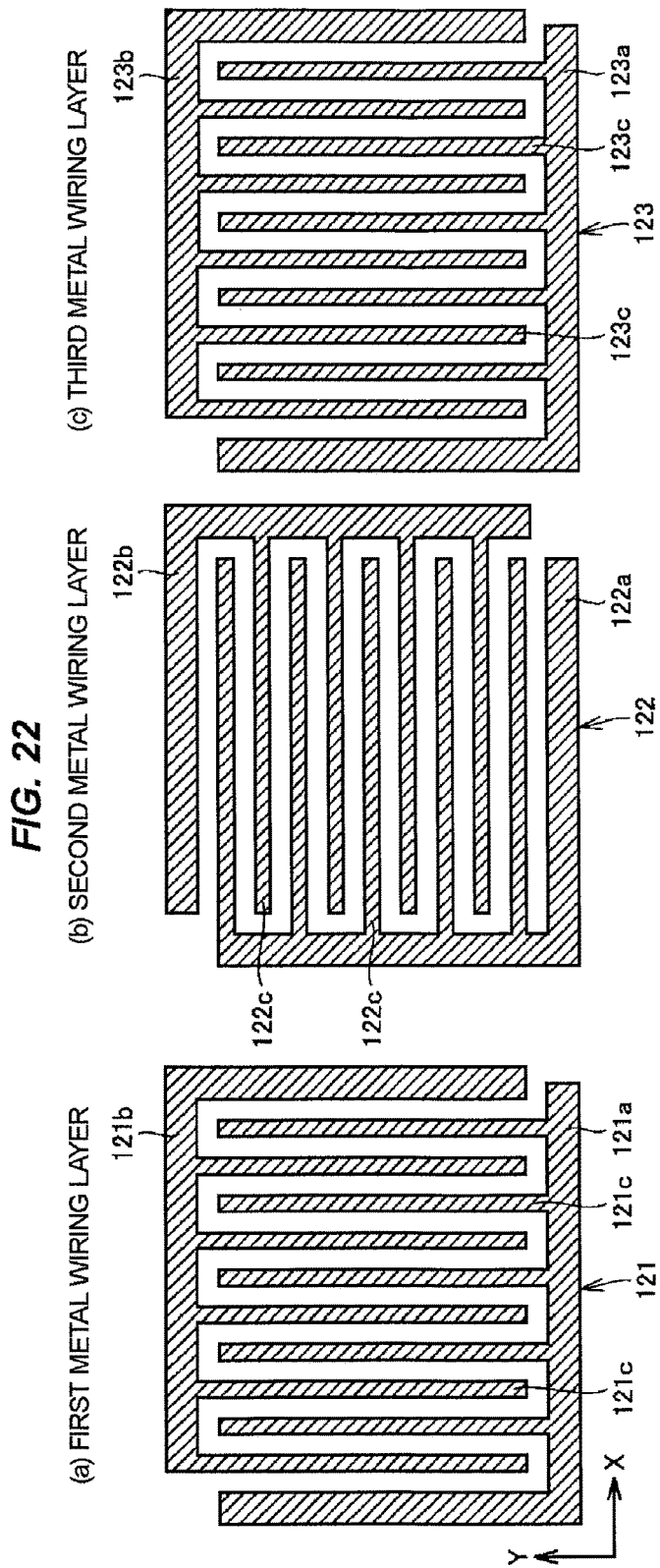
FIG. 22 is a view illustrating the configuration of a capacitor 111 illustrated in FIG. 18.

FIGS. 22A to 22C are plan views each illustrating the structure of the capacitor 111. In FIGS. 22A to 22C, the capacitor 111 is a MOM capacitive element 121 formed from a first metal wiring layer, a MOM capacitive element 122 formed from a second metal wiring layer, and a MOM capacitive element 123 formed from a third metal wiring layer which are coupled in parallel. Each of the MOM capacitive elements 121 to 123 is arranged in a square-shaped region. The MOM capacitive elements 121 to 123 are sequentially arranged above the gate electrode 117 of the varactor capacitive element 110 illustrated in FIG. 19. The respective areas of the MOM capacitive elements 121 to 123 are substantially the same as the area of the varactor capacitive element 110.

The MOM capacitive element 121 includes an L-shaped plus terminal 121a arranged at a lower end and left end of the square-shaped region, an L-shaped minus terminal 121b arranged at an upper end and right end, and a plurality of (ten in the drawing) I-shaped electrodes 121c arranged between the terminals 121a and 121b. The electrodes 121c are arranged in the X direction (horizontal direction) in the drawing, and each electrode 121c extends in the Y direction (vertical direction) in the drawing. Each electrode 121c with an odd number among the electrodes 121c is coupled to the minus terminal 121b, and each electrode 121c with an even number is coupled to the plus terminal 121a. An insulating material is filled between the terminals 121a and 121b and the electrode 121c. Accordingly, a capacitor is formed between the terminals 121a and 121b.

Similarly, the MOM capacitive element 122 includes an L-shaped plus terminal 122a arranged at a lower end and left end in a square-shaped region, an L-shaped minus terminal 122b arranged at an upper end and right end, and a plurality of (ten in the drawing) I-shaped electrodes 122c arranged between the terminals 122a and 122b. The electrodes 122c are arranged in the Y direction (vertical direction) in the drawing, and each electrode 122c extends in the X direction (horizontal direction) in the drawing. Each electrode 122c with an odd number among the electrodes 122c is coupled to the plus terminal 122a, and each electrode 122c with an even number is coupled to the minus terminal 122b. An insulating material is filled between the terminals 122a and 122b and the electrode 122c. Accordingly, a capacitor is formed between the terminals 122a and 122b.

In the same way, the MOM capacitive element 123 includes an L-shaped plus terminal 123a arranged at a lower end and left end in a square-shaped region, an L-shaped minus terminal 123b arranged at an upper end and right end, and a plurality of (ten in the drawing) I-shaped electrodes 123c arranged between the terminals 123a and 123b. The electrodes 123c are arranged in the X direction (horizontal direction) in the drawing, and each electrode 123c extends in the Y direction (vertical direction) in the drawing. Each electrode 123c with an odd number among the electrodes 123c is coupled to the minus terminal 123b, and each electrode 123c with an even number is coupled to the plus terminal 123a. An insulating material is filled between the terminals 123a and 123b and the electrode 123c. Accordingly, a capacitor is formed between the terminals 123a and 123b.

The plus terminals 121a, 122a, and 123a are coupled to one another via a plurality of through-holes. The minus terminals 121b, 122b, and 123b are coupled to one another via a plurality of through-holes. Accordingly, the MOM capacitive elements 121 to 123 are coupled in parallel to constitute one capacitor 111. Meanwhile, the plus terminal 121a is coupled to the plus terminal 110a of the varactor capacitive element 110, and the minus terminal 121b is coupled to the minus terminal 110b of the varactor capacitive element 110. Therefore, the capacitance value per unit area can be increased.

Figure 23:
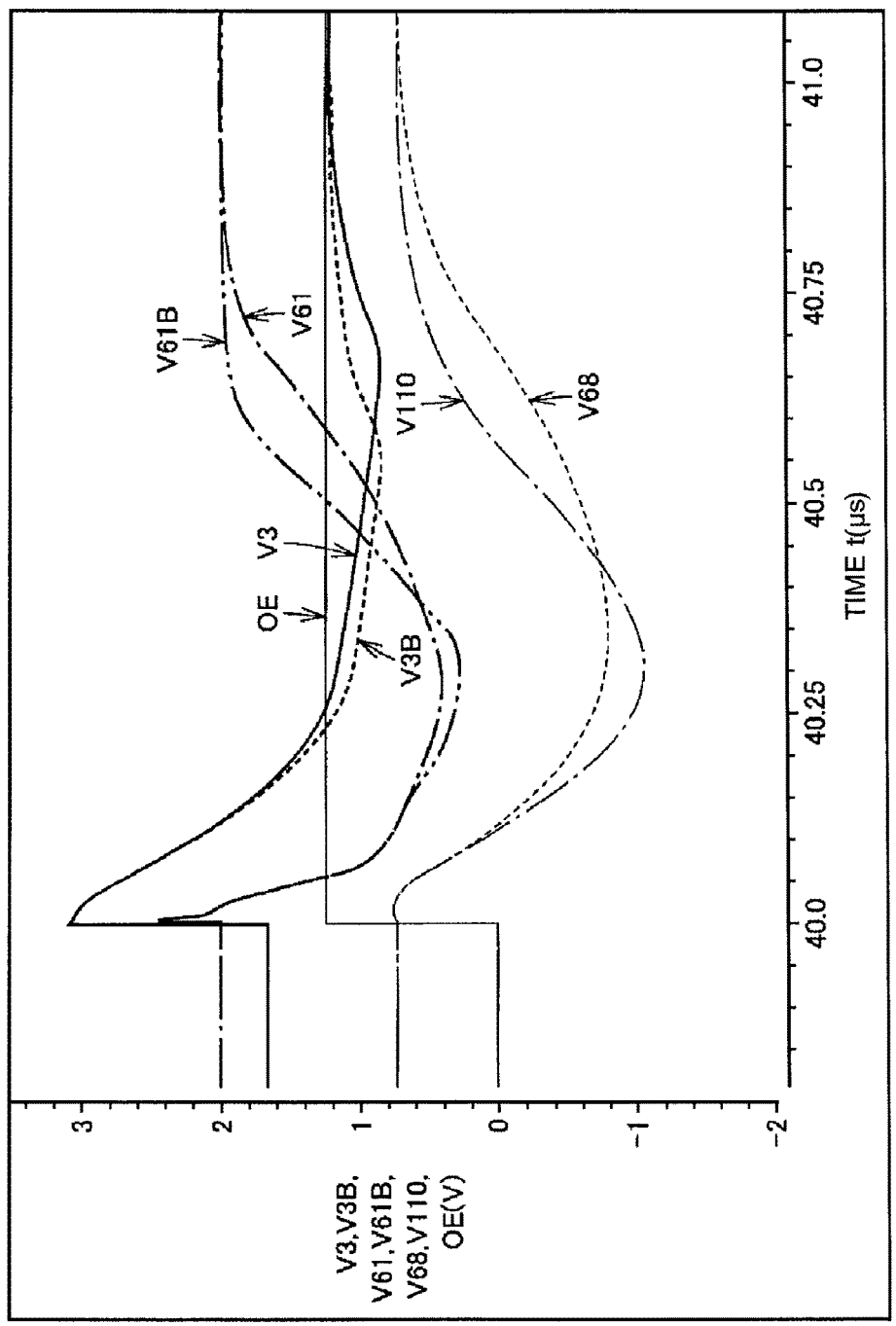
FIG. 23 is a time chart for illustrating an effect of the varactor capacitive element illustrated in FIG. 18.

Next, the effect of the varactor capacitive element 110 will be described. FIG. 23 is a time chart for comparing a case where the varactor capacitive element 110 and the capacitor 111 are used as the phase compensation circuit with a case where the capacitor 68 is used as the phase compensation circuit. FIG. 23 illustrates the waveform of the signal OE as well as the temporal changes of the output voltage V3B of the temperature sensor 3, the gate voltage V61B of the transistor 67, and the voltage V110 between the both terminals of the varactor capacitive element 110, in the case where the varactor capacitive element 110 and the capacitor 111 are used as the phase compensation circuit. Furthermore, FIG. 23 illustrates the output voltage V3 of the temperature sensor 3, the gate voltage V61 of the transistor 67, and the voltage V68 between the both terminals of the capacitor 68 in the case where the capacitor 68 is used as the phase compensation circuit.

FIG. 23 illustrated the voltages V3, V3B, V61, V61B, V110, and V68 and the waveform of the signal OE in the case where the signal OE is raised from an "L" level to an "H" level at a certain time (40 μs in the drawing), and then instantaneously the output terminal 3a of the temperature sensor 3 is precharged to the power source voltage VDD, and thereafter only the operational amplifier 11 drives the output terminal 3a of the temperature sensor 3.

Meanwhile, the "L" level of the signal OE in FIG. 23 is 0 V and the "H" level is 1.25 V. The signal OE of FIG. 23, the "H" level of which is raised to the power source voltage VDD (3.3 V) by means of a level shifter (not shown), serves as the output enabling signal OE of FIG. 18. Since the delay time of the level shifter (not shown) is in the order of ns, the difference in timing between the output enabling signal OE of FIG. 18 and the signal OE of FIG. 23 is indistinguishably small.

In FIG. 23, the voltage V110 and the voltage V68 become the power source voltage VDD immediately after the signal OE is raised from an "L" level to an "H" level, and thereafter when time has sufficiently elapsed and the output voltages V3 and V3B of the temperature sensor 3 have been settled (42 μs), the voltage V110 and the voltage V68 become the same value.

However, the voltage V110 becomes a negative voltage more rapidly than the voltage V68 and thereafter rises more rapidly. This is because in the case where the varactor capacitive element 110 is used, the capacitance value Cb decreases when the voltage V110 (=Vb) between the both terminals becomes negative as illustrated in FIG. 21. When the voltage V61B is raised by charging the gate electrode 117, it is sufficient that the small capacitance value Cb may be charged. Therefore, the voltage V61B of the gate electrode 117 rises more rapidly than the voltage V61, and accordingly the output voltage V3B of the temperature sensor 3 also reaches a setting potential more rapidly than the voltage V3.

In the fourth embodiment, because the varactor capacitive element 110 is used as the capacitor of the phase compensation circuit, the settling time of the output voltage of the temperature sensor 3 can be reduced.

Fifth Embodiment

Figure 24:
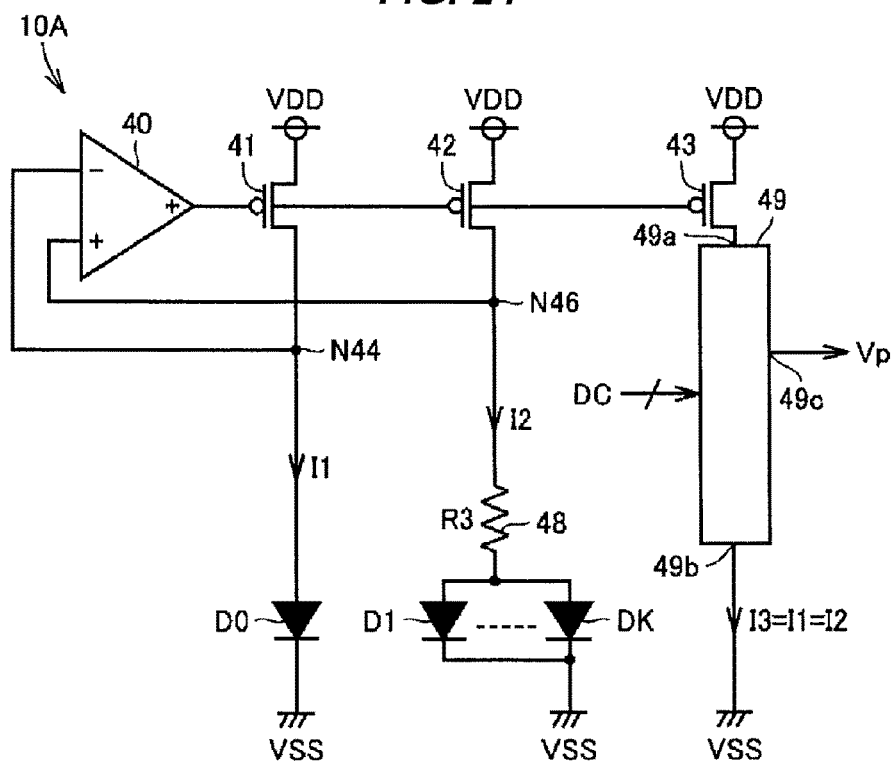
FIG. 24 is a circuit block diagram illustrating the configuration of a PTAT signal generation circuit of a temperature sensor included in a microcomputer according to a fifth embodiment of the present application.

FIG. 24 is a circuit diagram illustrating the configuration of a PTAT signal generation circuit 10A of a temperature sensor included in a microcomputer according to a fifth embodiment of the present application, and is the diagram to be compared with FIG. 5. Referring to FIG. 24, the PTAT signal generation circuit 10A differs from the PTAT signal generation circuit 10 of FIG. 5 in that the resistive elements 44 to 47 are removed.

The drain (node N44) of the transistor 41 is coupled to the anode of the diode D0 and also coupled to the inverting input terminal (− terminal) of the operational amplifier 40. The drain (node N46) of the transistor 42 is coupled to the anodes of the diodes D1 to DK via the resistive element 48 and is also coupled to the non-inverting input terminal (+terminal) of the operational amplifier 40.

The operational amplifier 40 and the transistors 41 and 42 constitute a current source that causes the voltage of the node N44 to coincide with the voltage of the node N46 and causes the current I1 flowing through the node N44 to coincide with the current I2 flowing through the node N46.

Assuming that I1=I2=I holds, a current I3 flowing through the trimming circuit 49 is given by I3=I. The current I results in a PTAT current that varies in proportion to the absolute temperature T as described using Formulas (1) and (2) in the first embodiment. The trimming circuit 49 outputs a PTAT signal having the voltage Vp proportional to the PTAT current I.

In the PTAT signal generation circuit 10A of FIG. 24, the voltages of the nodes N44 and N46 are set lower by removing the resistive elements 44 to 47. Therefore, the input terminals of the operational amplifier 40 need to be the gate of a P-channel MOS transistor, respectively.

Figure 25:
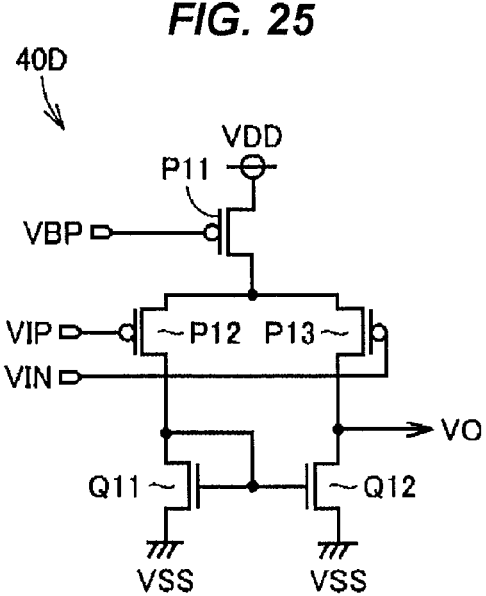
FIG. 25 is a circuit diagram illustrating the configuration of an operational amplifier illustrated in FIG. 24.

FIG. 25 is a circuit diagram illustrating the configuration of a P-type operational amplifier 40D. In FIG. 25, the operational amplifier 40D includes P-channel MOS transistors P11 to P13 and N-channel MOS transistors Q11 and Q12. The sources of the P-channel MOS transistors P12 and P13 are coupled to each other, and are coupled to the line of the power source voltage VDD via the P-channel MOS transistor P11. The drains of the P-channel MOS transistors P12 and P13 are coupled to the line of the ground voltage VSS via the N-channel MOS transistors Q11 and Q12, respectively. Both the gates of the N-channel MOS transistors Q11 and Q12 are coupled to the drain of the N-channel MOS transistor Q11.

The gates of the P-channel MOS transistors P12 and P13 serve as the non-inverting input terminal and the inverting input terminal, respectively, and receive the voltages VIP and VIN, respectively. The drain of the P-channel MOS transistor P13 serves as the output terminal and outputs the voltage VO. The gate of the P-channel MOS transistor P11 receives the bias voltage VBP. The P-channel MOS transistor P11 constitutes a constant current source.

When VIP>VIN holds, a current flowing through the transistors P12, Q11, and Q12 becomes smaller than a current flowing through the transistor P13 and thus the output voltage VO rises. When VIP<VIN holds, the current flowing through transistors P12, Q11, and Q12 becomes larger than the current flowing through the transistor P13, and thus the output voltage VO falls.

Figure 26:
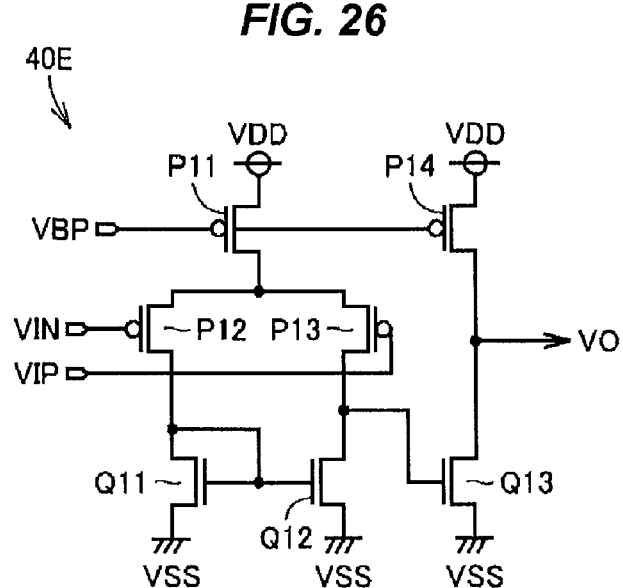
FIG. 26 is another circuit diagram illustrating the configuration of the operational amplifier illustrated in FIG. 24.

FIG. 26 is a circuit diagram illustrating the configuration of a P-type operational amplifier 40E. In FIG. 26, the operational amplifier 40E is the operational amplifier 40D of FIG. 25 with a P-channel MOS transistor P14 and an N-channel MOS transistor Q13 added. However, the gates of the P-channel MOS transistors P12 and P13 serve as the inverting input terminal and the non-inverting input terminal, respectively, and receive the voltages VIN and VIP, respectively.

The P-channel MOS transistor P14 and the N-channel MOS transistor Q13 are coupled in series between the line of the power source voltage VDD and the line of the ground voltage VSS. The gate of the N-channel MOS transistor Q13 is coupled to the drain of the N-channel MOS transistor Q12. The drain of the N-channel MOS transistor Q13 serves as the output terminal of the operational amplifier 40E, and outputs the voltage VO. The gate of the P-channel MOS transistor P14 receives the bias voltage VBP. The P-channel MOS transistor Q14 constitutes a constant current source.

When VIP>VIN holds, the current flowing through the transistors P12, Q11, and Q12 becomes larger than the current flowing through the transistors P13, and thus the voltage of the drain of the transistor Q12 falls. Accordingly, the current flowing through the transistor Q13 becomes smaller than the current flowing through the transistor P14, and thus the output voltage VO rises.

When VIP<VIN holds, the current flowing through the transistors P12, Q11, and Q12 becomes smaller than the current flowing through the transistors P13, and thus the voltage of the drain of the transistor Q12 rises. Accordingly, the current flowing through the transistor Q13 becomes larger than the current flowing through the transistor P14, and thus the output voltage VO rises.

Figure 27:
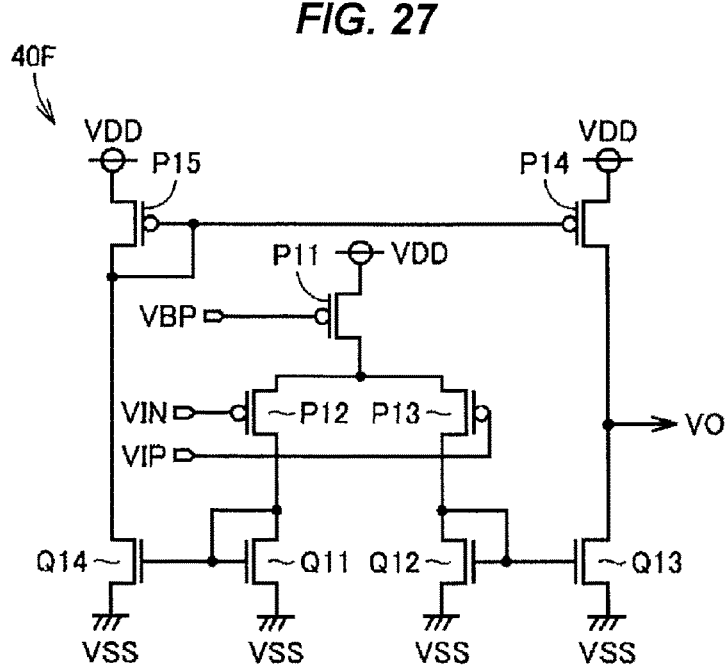
FIG. 27 is a yet another circuit diagram illustrating the configuration of the operational amplifier illustrated in FIG. 24.

FIG. 27 is a circuit diagram illustrating the configuration of a P-type operational amplifier 40F. In FIG. 27, the operational amplifier 40F is the operational amplifier 40E of FIG. 26 with a P-channel MOS transistor P15 and an N-channel MOS transistor Q14 added. However, the gate of the N-channel MOS transistor Q12 is separated from the gate of the N-channel MOS transistor Q11 and is coupled to the drain of the N-channel MOS transistor Q12. Furthermore, the gate of the P-channel MOS transistor P14 is coupled to the gate of the P-channel MOS transistor P15 instead of receiving the bias voltage VBP.

The P-channel MOS transistor P15 and the N-channel MOS transistor Q14 are coupled in series between the line of the power source voltage VDD and the line of the ground voltage VSS. The gate of the N-channel MOS transistor Q14 is coupled to the gate of the N-channel MOS transistor Q11. The gate and drain of the P-channel MOS transistor P15 are coupled to each other. Each of the transistors P15, Q11, and Q12 constitutes a diode.

When VIP>VIN holds, a current flowing through the transistors P12, Q11, Q14, P15, and P14 becomes larger than a current flowing through the transistors P13, Q12, and Q13 and thus the output voltage VO that is the voltage of the drain of the transistor Q13 rises. When VIP<VIN holds, the current flowing through the transistors P12, Q11, Q14, P15, and P14 becomes smaller than the current flowing through the transistors P13, Q12, and Q13, and thus the output voltage VO that is the voltage of the drain of the transistor Q13 falls.

The operational amplifier 40 of FIG. 25 may be any operational amplifier among the operational amplifiers 40D, 40E, and 40F of FIG. 25 to FIG. 27. Meanwhile, in FIG. 25 to FIG. 27, the illustration of the phase compensation circuit is omitted.

Since other configurations and operations are the same as those of the fourth embodiment, the description thereof is not repeated. Also with the fifth embodiment, the same effect as that of the fourth embodiment can be obtained.

Sixth Embodiment

Figure 28:
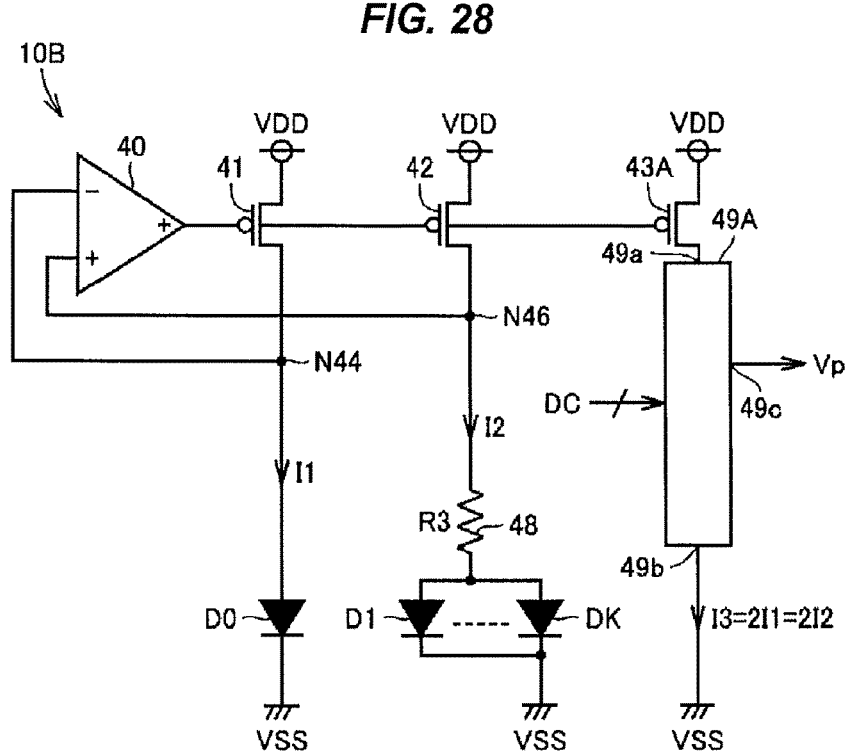
FIG. 28 is a circuit block diagram illustrating the configuration of a PTAT signal generation circuit of a temperature sensor included in a microcomputer according to a sixth embodiment of the present application.

FIG. 28 is a circuit diagram illustrating the configuration of a PTAT signal generation circuit 10B of a temperature sensor included in a microcomputer according to a sixth embodiment of the present application, and is the diagram to be compared with FIG. 24. Referring to FIG. 28, the PTAT signal generation circuit 10B differs from the PTAT signal generation circuit 10A of FIG. 24 in that the P-channel MOS transistor 43 and the trimming circuit 49 are replaced with a P-channel MOS transistor 43A and a trimming circuit 49A, respectively.

The size (namely, the current drive capability) of the P-channel MOS transistor 43A is M times the size of the P-channel MOS transistor 43. Where M is a real number greater than 1, for example M=2. Furthermore, the resistance value between the terminals 49a and 49b of the trimming circuit 49A is 1/M time the resistance value between the terminals 49a and 49b of the trimming circuit 49. Accordingly, when the absolute temperature T is the same, the voltage Vp of the PTAT signal output from the PTAT signal generation circuit 10B is the same as the voltage Vp of the PTAT signal output from the PTAT signal generation circuit 10A. Since the current drive capability of the PTAT signal generation circuit 10B is M times the current drive capability of the PTAT signal generation circuit 10A, the settling time of the output voltage of the temperature sensor 3 is reduced.

Figure 29:
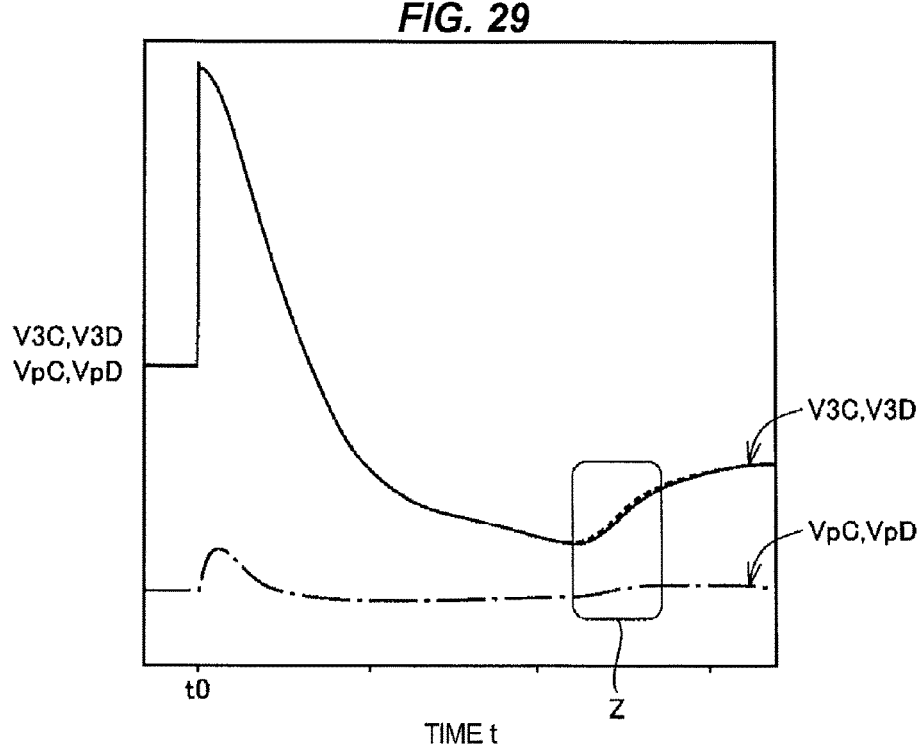
FIG. 29 is a time chart for illustrating an effect of the PTAT signal generation circuit illustrated in FIG. 28.
Figure 30:
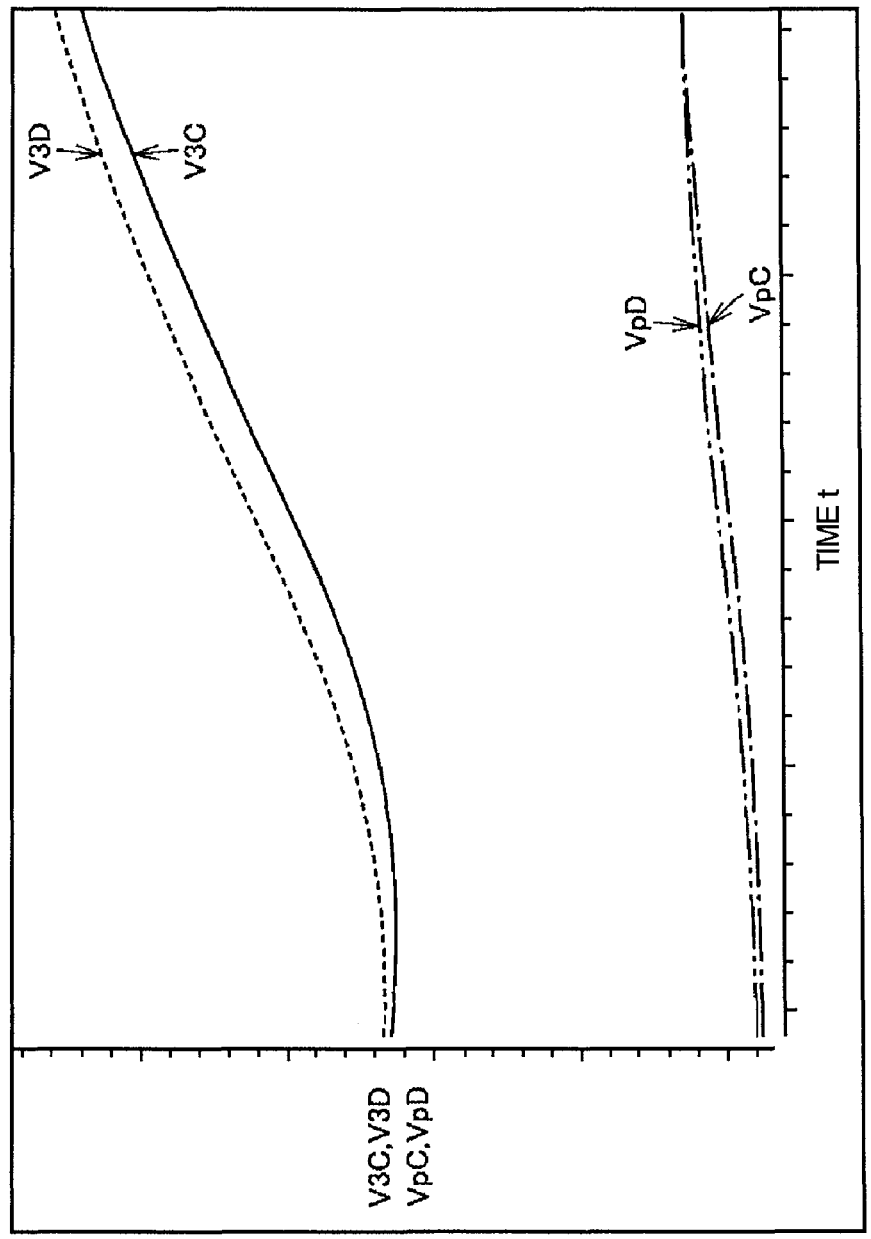
FIG. 30 is the enlarged view of a Z section of FIG. 29.

FIG. 29 is a time chart for illustrating the effect of the PTAT signal generation circuit 10B, and FIG. 30 is an enlarged view of a Z portion of FIG. 29. In FIG. 29 and FIG. 30, the voltage of a PTAT signal generated by the PTAT signal generation circuit 10A of FIG. 24 is represented by VpC, and the output voltage of the temperature sensor 3 using the PTAT signal generation circuit 10A is represented by V3C. Furthermore, the voltage of the PTAT signal generated by the PTAT signal generation circuit 10B of the sixth embodiment is represented by VpD, and the output voltage of the temperature sensor 3 using the PTAT signal generation circuit 10B is represented by V3D.

FIG. 29 illustrates a case where at a certain time t0, the output enabling signal OE is changed from an "L" level to an "H" level, and then the output terminal 3a of the temperature sensor 3 is precharged to the power source voltage VDD, and thereafter only the amplifier circuit (amplifier circuit of FIG. 18) at the subsequent stage of the PTAT signal generation circuits 10A and 10B drives the output terminal 3a.

As illustrated in FIG. 29, when the output voltages V3C and V3D of the temperature sensor 3 are pulled up to the power source voltage VDD, the source voltage of the P-channel MOS transistor 63 of FIG. 18 is pulled up by capacitive coupling, and furthermore the voltages VpC and VpD of the PTAT signal are pulled up by a coupling capacity between the source and gate of the P-channel MOS transistor 63. As described above, when the voltages VpC and VpD of the PTAT signal shift from a voltage to be settled, the voltages V3C and V3D that are (R1+R2)/R2 times the voltages VpC and VpD will also shift from the voltage to be settled.

As illustrated in FIG. 30, V3D approaches the setting voltage more quickly than V3C, and VpD approaches the setting voltage more quickly than VpC.

In the sixth embodiment, because the current drive capability of the PTAT signal generation circuit 10B is increased, the settling time of the output voltage V3 of the temperature sensor 3 can be reduced.

Seventh Embodiment

Figure 31:
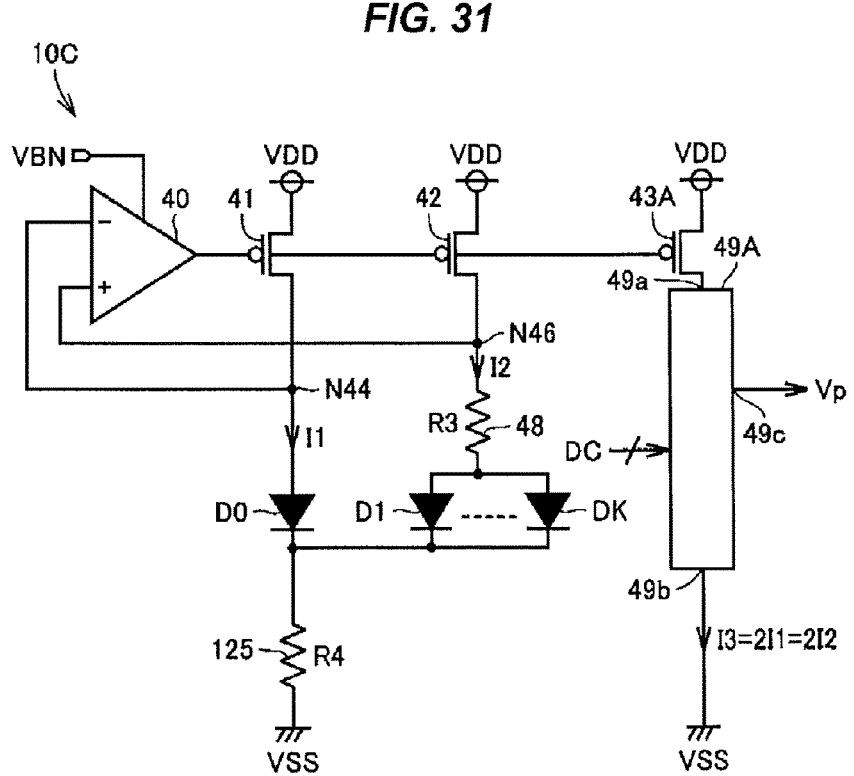
FIG. 31 is a circuit block diagram illustrating the configuration of a PTAT signal generation circuit of a temperature sensor included in a microcomputer according to a seventh embodiment of the present application.

FIG. 31 is a circuit diagram illustrating the configuration of a PTAT signal generation circuit 10C of a temperature sensor included in a microcomputer according to a seventh embodiment of the present application, and is the diagram to be compared with FIG. 28. Referring to FIG. 31, the PTAT signal generation circuit 10C differs from the PTAT signal generation circuit 10B of FIG. 28 in that a resistive element 125 is added.

The resistive element 125 is coupled between the cathode of the diodes D0 to DK and the line of the ground voltage VSS. Assuming that the resistance value of the resistive element 125 is R4, then the voltage between the both terminals of the resistive element 125 is given by R4(I1+I2). Accordingly, by setting the resistance value R4 of the resistive element 125 to an appropriate value, the voltages of the nodes N44 and N46 are raised by R4(I1+I2), so that the N-type operational amplifiers 40A to 40C of FIG. 7 to FIG. 9 can be used as the operational amplifier 40 and the circuit area can be reduced.

With the seventh embodiment, the same effect as that of the sixth embodiment can be obtained and additionally the circuit area can be reduced.

Eighth Embodiment

Figure 32:
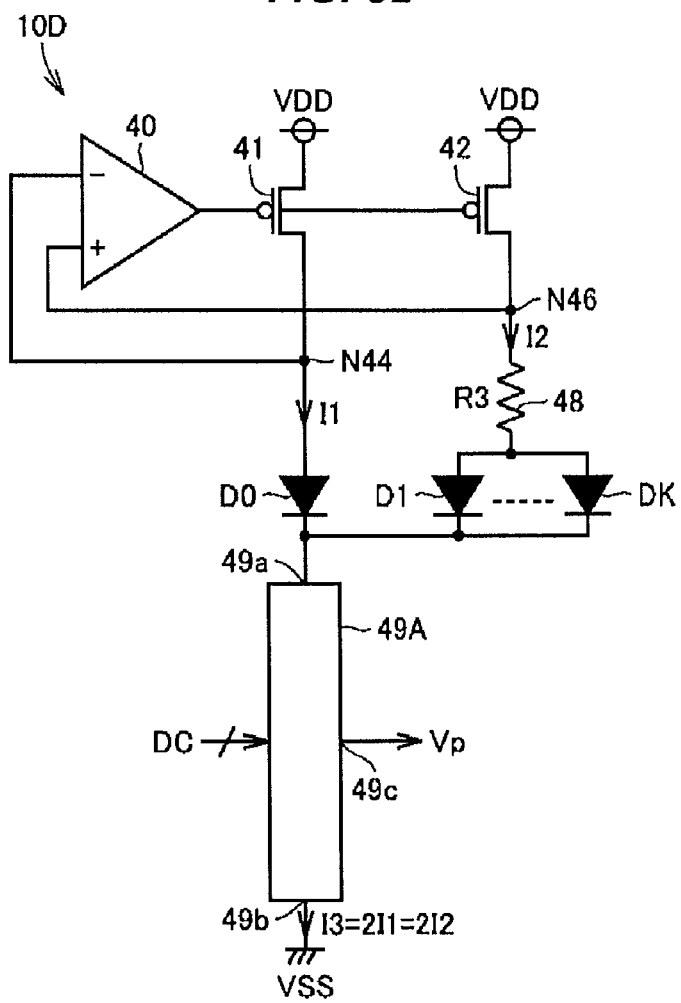
FIG. 32 is a circuit block diagram illustrating the configuration of a PTAT signal generation circuit of a temperature sensor included in a microcomputer according to an eighth embodiment of the present application.

FIG. 32 is a circuit diagram illustrating the configuration of a PTAT signal generation circuit 10D of a temperature sensor included in a microcomputer according to an eighth embodiment of the present application, and is the diagram to be compared with FIG. 31. Referring to FIG. 32, the PTAT signal generation circuit 10D differs from the PTAT signal generation circuit 10C of FIG. 31 in that the resistive element 125 and the P-channel MOS transistor 43A are removed and that the trimming circuit 49A is coupled between the cathodes of the diodes D0 to DK and the line of the ground voltage VSS.

In the PTAT signal generation circuit 10D, the current I3 flowing through the trimming circuit 49A is given by I3=2I1=2I2, and the resistance value of the trimming circuit 49A is a half the resistance value of the trimming circuit 49. That is, the trimming circuit 49A constitutes an output circuit that outputs, on the basis of the current I3 flowing through the diodes D0 to DK, the voltage Vp proportional to the absolute temperature T. Accordingly, as with the sixth embodiment, a reduction of the settling time can be achieved.

Furthermore, since the voltages of the nodes N44 and N46 can be increased by the voltage between the terminals 49a and 49b of the trimming circuit 49A, the N-type operational amplifiers 40A to 40C can be used as the operational amplifier 40 and the circuit area can be reduced.

Furthermore, in the PTAT signal generation circuits 10B and 10C of FIG. 28 and FIG. 31, since the drain voltages of the transistors 41 and 42 differ from the drain voltage of the transistor 43A, it is not easy to precisely set I3=2I1=2I2. In contrast to this, in the PTAT signal generation circuit 10D of the eighth embodiment, I3=2I1=2I2 can be precisely set and the accuracy of the PTAT signal can be improved.

Ninth Embodiment

Figure 33:
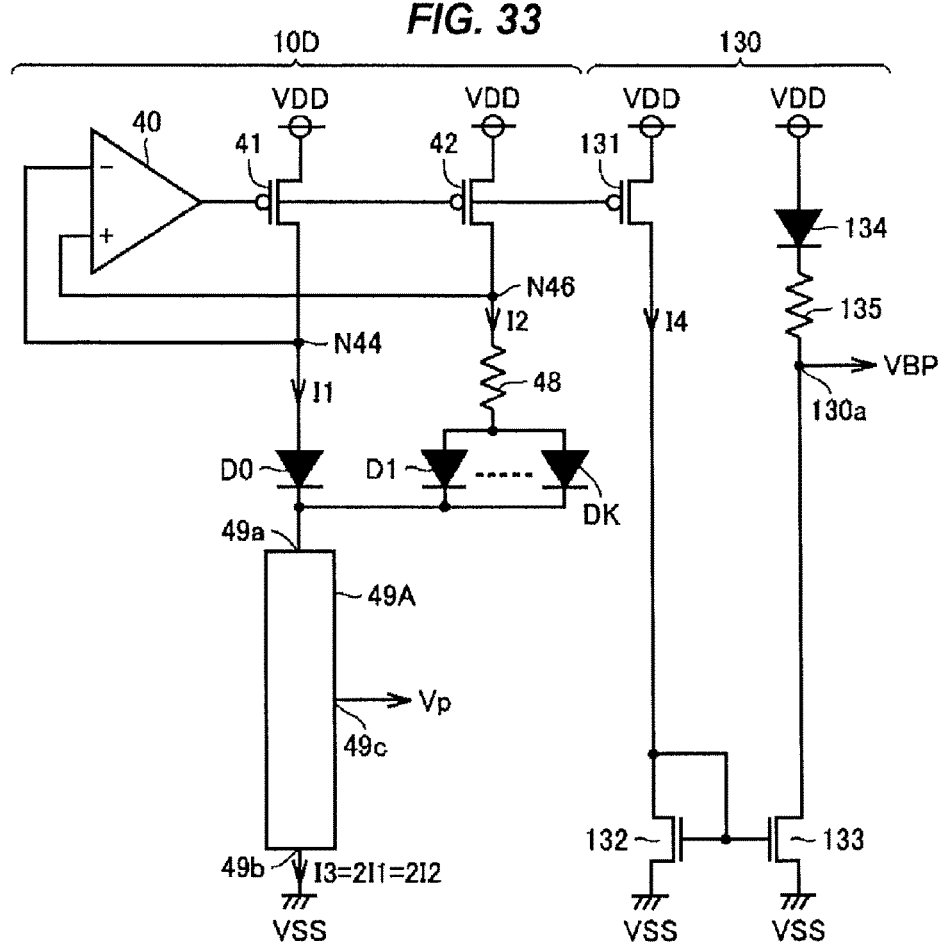
FIG. 33 is the circuit block diagram illustrating a principal part of a temperature sensor included in a microcomputer according to a ninth embodiment of the present application.

FIG. 33 is a circuit block diagram illustrating the principal part of a temperature sensor included in a microcomputer according to a ninth embodiment of the present application. In FIG. 33, this temperature sensor includes the PTAT signal generation circuit 10D illustrated in FIG. 32, a bias voltage generation circuit 130, and the amplifier circuit of FIG. 18.

The bias voltage generation circuit 130 includes a P-channel MOS transistor 131, N-channel MOS transistors 132 and 133, a diode 134, and a resistive element 135. The transistors 131 and 132 are coupled in series between the line of the power source voltage VDD and the line of the ground voltage VSS. The gate of the transistor 131 is coupled to the gates of the transistors 41 and 42. The gate and drain of the transistor 132 are coupled to each other.

The anode of the diode 134 is coupled to the line of the power source voltage VDD, and the cathode thereof is coupled to the line of the ground voltage VSS via the resistive element 135 and the transistor 133. The gate of the transistor 133 is coupled to the gate of the transistor 132. The drain of the transistor 133 serves as an output terminal 130a of the bias voltage generation circuit 130.

The transistors 131, 132, and 133 constitute a constant current source that feeds a constant current I4 of a value corresponding to the constant currents I1 and I2. The bias voltage VBP that is lower than the power source voltage VDD by a voltage drop of the diode 134 and a voltage drop of the resistive element 135 is output to the output terminal 130a. The bias voltage VBP is supplied to the gates of the P-channel MOS transistors 60 and 61 of the amplifier circuit illustrated in FIG. 18. In the ninth embodiment, the bias voltage VBP can be easily generated.

Tenth Embodiment

Figure 34:
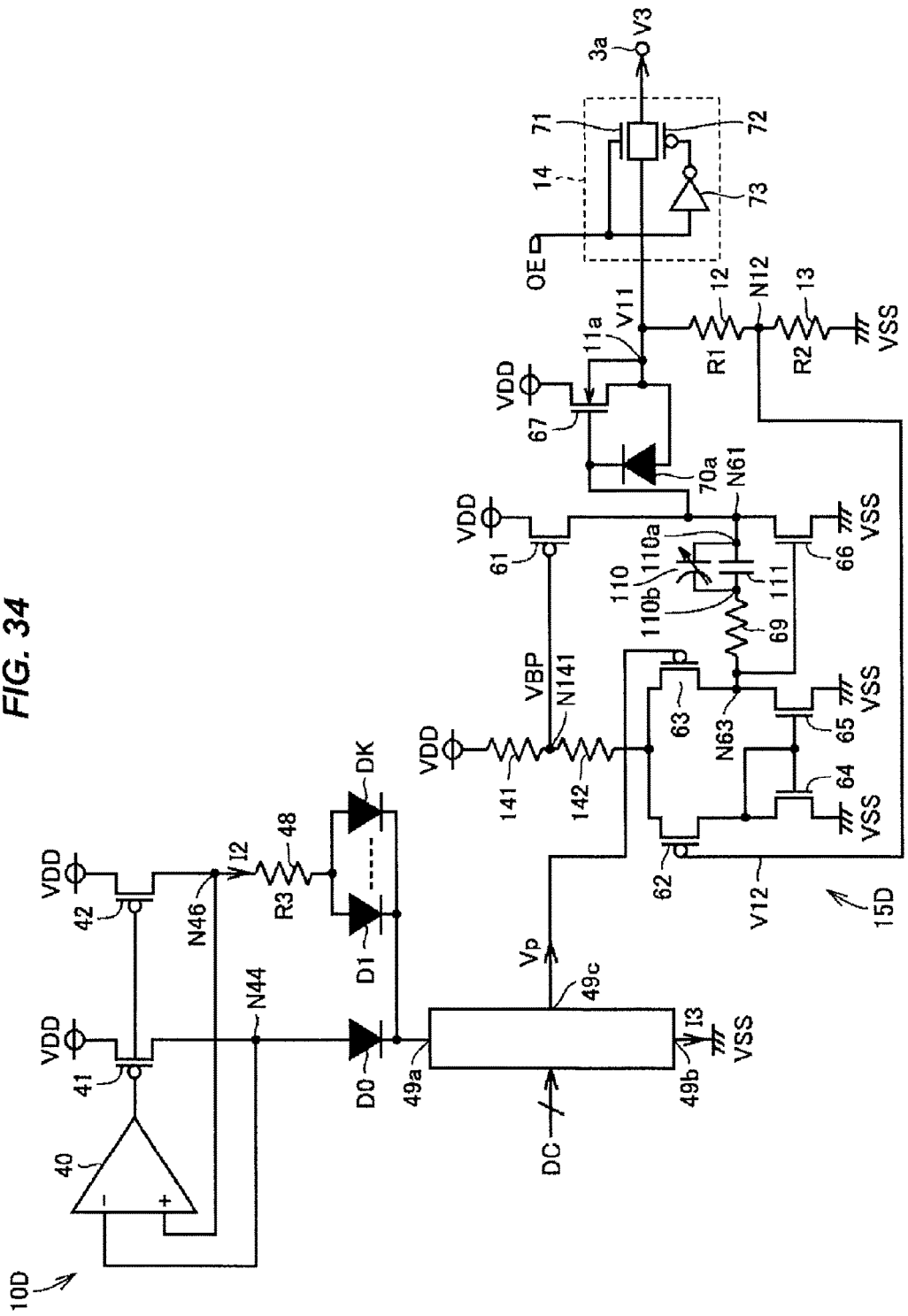
FIG. 34 is a circuit block diagram illustrating the configuration of a temperature sensor included in a microcomputer according to a tenth embodiment of the present application.

FIG. 34 is a circuit block diagram illustrating the configuration of a temperature sensor included in a microcomputer according to a tenth embodiment of the present application. In FIG. 34, the temperature sensor includes the PTAT signal generation circuit 10D and an amplifier circuit 15D. In this temperature sensor, it is not necessary to provide a bias voltage generation circuit separately.

Figure 35:
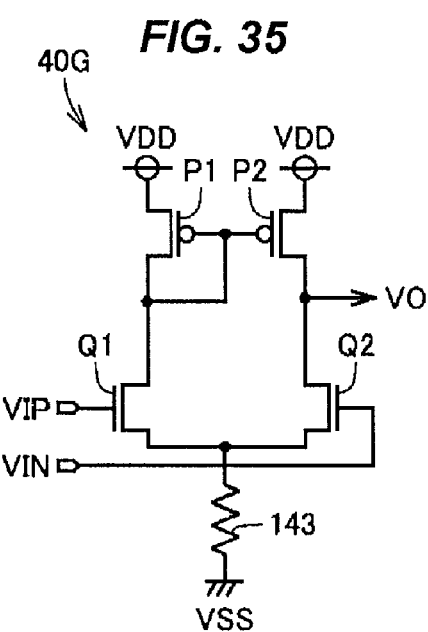
FIG. 35 is a circuit diagram illustrating the configuration of an operational amplifier illustrated in FIG. 34.

The PTAT signal generation circuit 10D has been as described in FIG. 32, but as the operational amplifier 40, N-type operational amplifiers 40G and 40H that do not require the bias voltage VBN are used. FIG. 35 is the circuit diagram illustrating the configuration of the operational amplifier 40G and is the diagram to be compared with FIG. 7. Referring to FIG. 35, the operational amplifier 40G is the operational amplifier 40A of FIG. 7 with the N-channel MOS transistor Q3 replaced with a resistive element 143. The resistive element 143 is coupled between the sources of the N-channel MOS transistors Q1 and Q2 and the line of the ground voltage VSS and constitutes a constant current source for feeding a constant current. The operation of the operational amplifier 40G is the same as the operation of the operational amplifier 40A.

Figure 36:
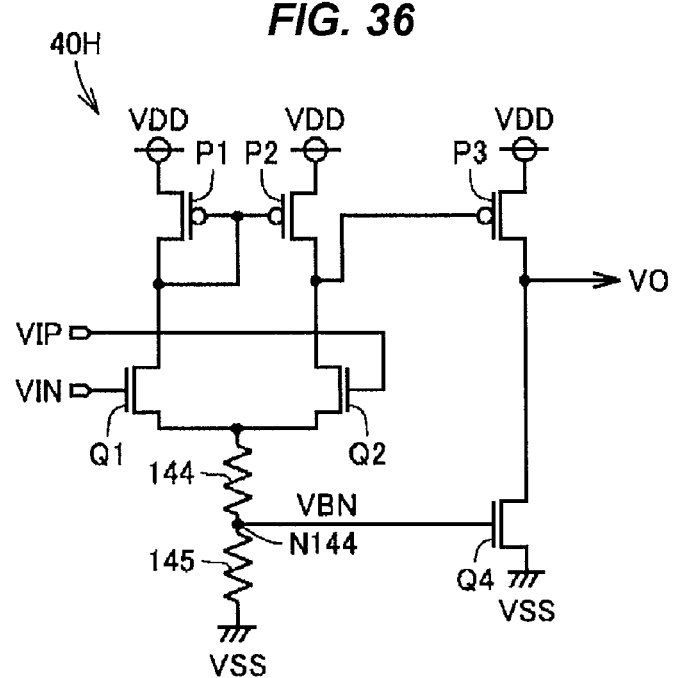
FIG. 36 is another circuit diagram illustrating the configuration of the operational amplifier illustrated in FIG. 34.

FIG. 36 is a circuit diagram illustrating the configuration of the operational amplifier 40H and is the diagram to be compared with FIG. 8. Referring to FIG. 36, the operational amplifier 40H is the operational amplifier 40B of FIG. 8 with the N-channel MOS transistor Q3 replaced with resistive elements 144 and 145. The resistive elements 144 and 145 are coupled in series between the sources of the N-channel MOS transistors Q1 and Q2 and the line of the ground voltage VSS, constitute a constant current source for feeding a constant current, and also constitute a bias voltage generation circuit that generates the bias voltage VBN. At a node N144 between the resistive elements 144 and 145, the bias voltage VBN of a value obtained by multiplying the constant current flowing through the resistive element 145 by the resistance value of the resistive element 145 is generated. The bias voltage VBN is supplied to the gate of the N-channel MOS transistor Q4. The operation of the operational amplifier 40H is the same as the operation of the operational amplifier 40B.

Returning to FIG. 34, the amplifier circuit 15D is the amplifier circuit 15C of FIG. 18 with the P-channel MOS transistor 60 replaced with resistive elements 141 and 142. The resistive elements 141 and 142 are coupled in series between the line of the power source voltage VDD and the sources of the P-channel MOS transistors 62 and 63, constitute a constant current source for feeding a constant current, and also constitute a bias voltage generation circuit that generates the bias voltage VBP. At a node N141 between the resistive elements 141 and 142, there is generated the bias voltage VBP which is lower than the power source voltage VDD by a voltage of a value that is obtained by multiplying the constant current flowing through the resistive element 141 by the resistance value of the resistive element 141. The bias voltage VBP is supplied to the gate of the P-channel MOS transistor 61. The operation of the amplifier circuit 15D is the same as the operation of the amplifier circuit 15C.

In the tenth embodiment, the settling time of the output voltage V3 of the temperature sensor 3 can be reduced and the circuit area can be reduced. Meanwhile, it is needless to say that the above-described first embodiment to tenth embodiment may be combined as appropriate.

The present invention made by the present inventor has been described specifically on the basis of the embodiments. However, it is needless to say that the present invention is not limited to the embodiments, and various modifications are possible without deviating from the gist of the invention.

What is claimed is:

1. A signal generation circuit comprising:
a first diode whose anode is coupled to a first node;
a first resistive element whose one-side terminal is coupled to a second node;
a second diode whose anode is coupled to other-side terminal of the first resistive element, whose cathode is coupled to a cathode of the first diode, and which has a current drive capability larger than the first diode;
a current source that causes the first and second nodes to have a same voltage and feeds a current of a same value through the first and second diodes;
an output circuit that is coupled between the cathodes of the first and second diodes and a line of a ground voltage and which outputs, on the basis of a current of a sum of the currents flowing through the first and second diodes, a voltage proportional to an absolute temperature,
an amplifier circuit that amplifies an output voltage of the output circuit; and
a variable conductance circuit that is coupled between the output terminal of the amplifier circuit and a line of a reference voltage and causes a current to flow from an output terminal of the signal generation circuit to the line of the reference voltage.

2. The signal generation circuit according to claim 1, wherein
the amplifier circuit further comprises a source follower amplifier including a first transistor whose source and back gate serve as an output terminal of the amplifier circuit, and
the variable conductance circuit comprises a diode whose anode is coupled to the output terminal of the amplifier circuit and whose cathode is coupled to the drain of the first transistor.

3. The signal generation circuit according to claim 1, wherein
a conductance of the variable conductance circuit increases in a period during which a voltage of the output terminal of the amplifier circuit is higher than a voltage to be settled.

4. The signal generation circuit according to claim 2, wherein
the first transistor is an N-type transistor.

5. The signal generation circuit according to claim 1, wherein a ratio between the voltage proportional to the absolute temperature and the current of a sum of the currents flowing through the first and second diodes is adjustable.

6. The signal generation circuit according to claim 5, wherein the output circuit includes:
a plurality of second resistor elements coupled in series between the cathodes of the first and second diodes and the line of the ground voltage; and
a switch circuit that couples a selected terminal, among terminals on a side of the cathodes of the first and second diodes of the second resistor elements, to an output terminal for outputting a voltage proportional to the absolute temperature.

* * * * *